(12) United States Patent
Thorne

(10) Patent No.: US 11,664,896 B2
(45) Date of Patent: **\*May 30, 2023**

(54) ENHANCING CONTRAST OF LIGHTING

(71) Applicant: Lawrence R. Thorne, Draper, UT (US)

(72) Inventor: Lawrence R. Thorne, Draper, UT (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/972,826

(22) PCT Filed: May 8, 2019

(86) PCT No.: PCT/US2019/031266
§ 371 (c)(1),
(2) Date: Dec. 7, 2020

(87) PCT Pub. No.: WO2019/236237
PCT Pub. Date: Dec. 12, 2019

(65) Prior Publication Data
US 2021/0250089 A1    Aug. 12, 2021

Related U.S. Application Data

(60) Provisional application No. 62/682,118, filed on Jun. 7, 2018.

(51) Int. Cl.
*H04B 10/116* (2013.01)
*H04B 10/532* (2013.01)
(Continued)

(52) U.S. Cl.
CPC ............ *H04B 10/116* (2013.01); *B64D 45/08* (2013.01); *H04B 10/532* (2013.01); *H04B 10/60* (2013.01); *G02B 5/3025* (2013.01)

(58) Field of Classification Search
CPC ............................................ H04B 10/114–116
See application file for complete search history.

(56) References Cited

U.S. PATENT DOCUMENTS 7,597,447 B2    10/2009   Larson et al.
2003/0164914 A1    9/2003   Weber et al.
(Continued)

FOREIGN PATENT DOCUMENTS

CN             104237873       12/2014

*Primary Examiner* — Nathan M Cors
(74) *Attorney, Agent, or Firm* — Thorpe North & Western, LLP

(57) ABSTRACT

Systems of enhancing contrast of lighting can include a light-transmitting subsystem having a light source to emit a stream or light-signal pulses and an encoding circularly polarizing filter to optically encode the stream of light-signal pulses with circular polarization, and a light-receiving subsystem including a decoding circularly polarizing filter to optically decode the circular polarization of the stream of light-signal pulses and a light imager to receive the stream of light-signal pulses after being optically decoded by the decoding circularly polarizing filter. In another example, the system can include a polarimetric light imaging assembly, a light source to generate a stream of light-signal pulses directed at the polarimetric light imaging assembly, and a control system to synchronously control the light-signal pulses to be emitted from the light source in timed correlation with a component(s) of the polarimetric light imaging assembly.

41 Claims, 9 Drawing Sheets

(51) Int. Cl.
*B64D 45/08* (2006.01)
*H04B 10/60* (2013.01)
*G02B 5/30* (2006.01)

(56) References Cited

U.S. PATENT DOCUMENTS

| | | |
|---|---|---|
| 2007/0016080 A1 | 1/2007 | Alfano et al. |
| 2007/0242337 A1* | 10/2007 | Bradley ................ G08G 1/161 340/5.1 |
| 2010/0002296 A1 | 1/2010 | Choi et al. |
| 2012/0128374 A1 | 5/2012 | Yang et al. |
| 2019/0014628 A1* | 1/2019 | Wang .................... H04B 10/50 |
| 2020/0366369 A1* | 11/2020 | Kyosuna ................ G06T 11/00 |

* cited by examiner

ENHANCING CONTRAST OF LIGHTING

BACKGROUND

The myriad operational, financial, and safety implications of airline flight delays/cancellations caused by visibility-reducing atmospheric conditions (such as fog, smog, dust, and storms) are well documented. These circumstances may be infrequent or frequent in occurrence depending on the geographical area, and in some instances, can have a major impact that is becoming increasingly significant as air travel and airport congestion worldwide escalates.

Many airports may now be converting to LED (light-emitting diode) lighting, which has certain advantages over the older incandescent and gas discharge lamps that have been more traditionally used, particularly in terms of color purity and saturation, energy efficiency, and lifetime. In low visibility conditions, however, LED lighting provides about the same level of visibility or may only be slightly better than the lighting systems that it is replacing.

BRIEF DESCRIPTION OF THE DRAWINGS

Various embodiments of the present disclosure are shown and described in reference to the numbered drawings, wherein.

DETAILED DESCRIPTION

Figure 1A:
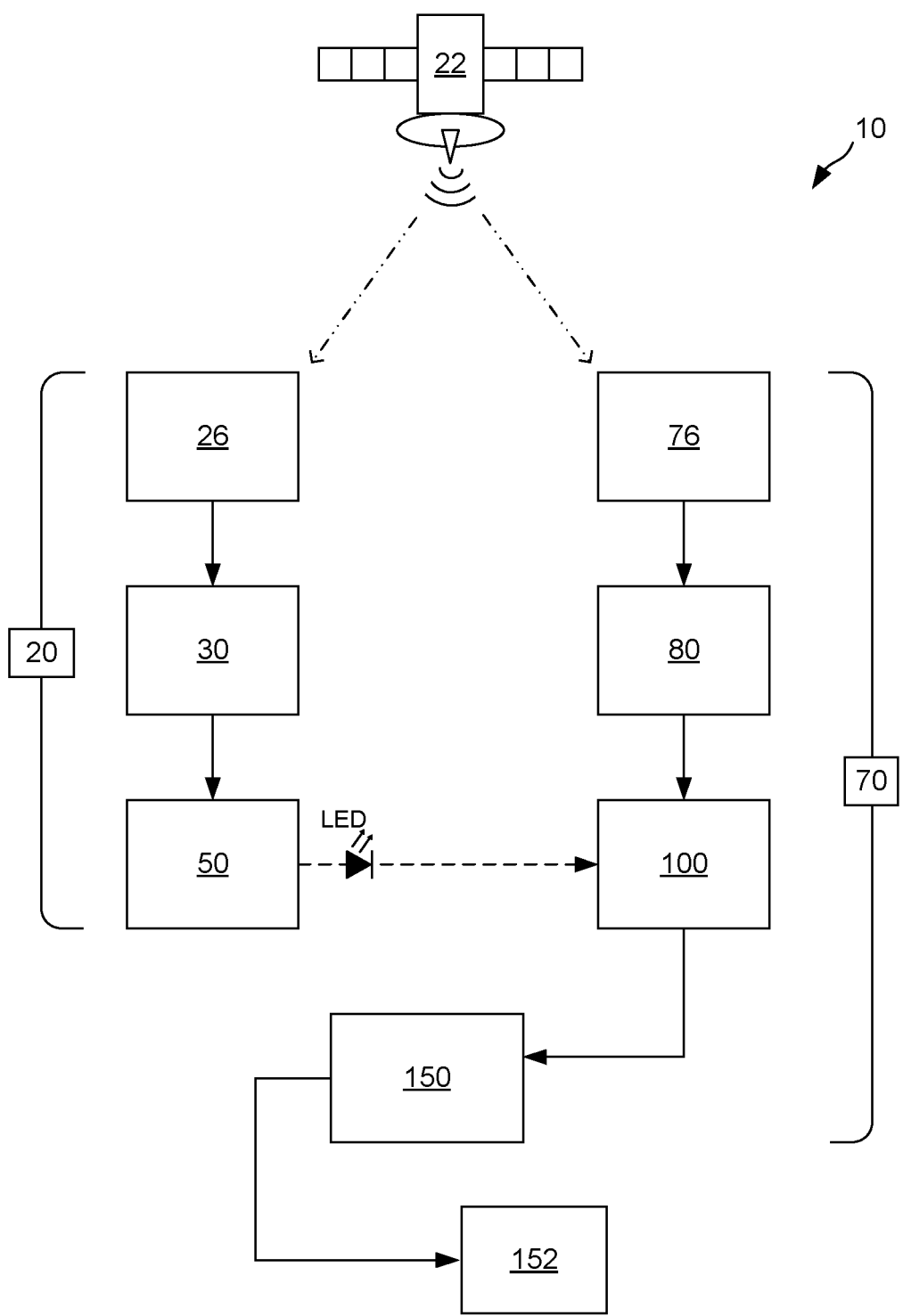
FIG. 1A is a component diagram of an example system for enhancing contrast of lighting in accordance with the present disclosure.

In accordance with examples of the present disclosure, an enhanced or enhancing contrast lighting system may offer visibility improvements under visibility-reducing atmospheric conditions (such as fog, smog, dust, storms, etc.) in both daytime and nighttime conditions, otherwise referred to herein as "low visibility conditions." This is, in part, because the photonic properties of LEDs can be exploited using the technology described in the present disclosure in a manner that can improve the visibility efficacy of the light source when digitally processed and displayed. In some examples, solid state light sources can be used, such as various types of light emitting diode (LED) light sources. As a preliminary matter, the term "LED" includes any solid state light source, such as any of a number of solid state light sources commonly referred to as LED lights, but also includes solid state laser diode light sources; or any of a number of super radiant or super lumen LED light sources, e.g., edge-emitting diode light sources, superluminescent diode (SLED or SLD) light sources; or the like. Likewise, it is understood that reference herein to LED lighting, LED lights, LED sources, or other references to LEDs is proved in the disclosure by example only, and other lighting technologies capable of functioning similarly to emit a stream of light-signal pulses that are available now or may be available in the future can be substituted therewith. Thus, such a limitation with respect to the term "LED" in any form should only be considered a limitation rather than an example to the extent the term LED is affirmatively included in the claims in accordance with the breadth afforded by the definition above, unless the specific context of a use demands otherwise.

The lighting contrast enhancing system of the present disclosure can be applicable in many industries where one or more mobile carriers would benefit from enhanced visibility of lights, e.g., LED lights, such as when navigating unknown and/or potentially dangerous terrain in low visibility conditions. Examples of "mobile carriers" can include fixed wing aircraft, rotary aircraft, automobiles, motorcycles, buses, semi-trailer trucks, boats, ships, trains, etc., regardless of whether the mobile carrier carries a single operator (e.g., pilot or driver), additional people and/or cargo other than the operator(s), or does not carry any passengers, e.g., aircraft drones or other remote operated vehicles or vessels.

In further detail, in accordance with examples of the present disclosure, low visibility conditions may be relative to the type of mobile carrier being operated. For example, a small fishing boat with high maneuverability may consider low visibility conditions to be anything less than ¼ mile, ⅛ mile, 100 yards, or 100 feet. On the other hand, in the case of aircraft navigation, low visibility unsuitable for Visual Flight Rules (VFR) in controlled airspace can be anything less than 3 statute miles. In further detail, the light (or LED light) contrast enhancing systems of the present disclosure can be appropriate for implementation across a variety of locations, including commercial, civilian, or military airfields, including at established runways, heliports, and aircraft carriers at sea, as well as oil rig landing sites, etc., and in a variety of other maritime operations, remote field, and/or disaster response efforts, etc. These types of systems could also be used at makeshift runways on private property, for example.

There are other applications where the systems and methods can be used, such as chemical detection of fluids or fluid components (gas or liquid); environmental safety equipment to detect dangerous gases in the atmosphere or in an enclosed area, e.g., house, office, building, room, utility area, factory, commercial space, etc.; sample analysis using light reflection or light scattering; security camera image enhancement using light or other pulsed electromagnetic energy outside of the visible spectrum; or other applications where image contrast enhancement may be beneficial.

In accordance with this, the present disclosure is drawn to systems and methods of enhancing contrast of light, or providing light-signal with enhanceable contrast at a receiving end, etc., by emitting and/or receiving various forms of modulated light. For example, a system of enhancing contrast of lighting can include a light-transmitting subsystem and a light-receiving subsystem. The light-transmitting subsystem can include a light source to emit a stream or light-signal pulses and an encoding circularly polarizing filter to optically encode the stream of light-signal pulses with circular polarization. The light-receiving subsystem can include a decoding circularly polarizing filter to optically decode the circular polarization of the stream of light-signal pulses and a light imager to receive the stream of light-signal pulses after being optically decoded by the decoding circularly polarizing filter. In one specific example, the light-receiving subsystem can further include a narrow bandpass filter, e.g., having a center wavelength profile that corresponds with a center wavelength emission of a wavelength range of light present in the stream of light-signal pulses.

In further detail, a method of enhancing contrast of lighting relative to background light can include emitting a stream of light-signal pulses from a light source of a light-transmitting subsystem, optically encoding the stream of light-signal pulses with circular polarization at the light source, and optically decoding the circular polarization of the stream of light-signal pulses at a light-receiving subsystem. The method can further include receiving the stream of light-signal pulses at a light imager of the light-receiving subsystem after optical decoding. Additional method steps can include synchronously correlating a light-receiving frequency (e.g., frame rate) of the light imager with a pulse frequency (or pulse modulation frequency) of the stream of light-signal pulses; synchronously correlating includes synchronously receiving, using a polarimetric light imaging assembly at the light-receiving subsystem, the stream of modulated light-signal pulses; synchronously correlating includes emitting the stream of light-signal pulses to include a first wavelength range of light and a second wavelength range of light; or synchronously correlating includes receiving the stream of light-signal pulses including a first wavelength range of light and the second wavelength range of light synchronously at the image light imager.

In another example system of enhancing contrast of lighting, such a system can include a light-transmitting subsystem including a light source to emit a stream or light-signal pulses having a first center wavelength emission of a first wavelength range of light, and a light-receiving subsystem. The light-receiving subsystem can include a narrow bandpass filter having a center wavelength profile that corresponds with the first center wavelength emission of the stream of light-signal pulses, and a light imager to receive the stream of light-signal pulses after being optically filtered by the narrow bandpass filter to accept the first center wavelength emission and reject wavelengths of light outside of a bandwidth of the narrow bandpass filter. In one specific example, the light-transmitting subsystem can further include an encoding circularly polarizing filter to optically encode the stream of light-signal pulses with circular polarization, and the light-receiving subsystem can include a decoding circularly polarizing filter to optically decode the circular polarization of the stream of light-signal pulses prior to the stream of light-signal pulses being received by the light imager.

In another example, a method of enhancing contrast of lighting relative to background light can include emitting a stream of light-signal pulses from a light source of a light-transmitting subsystem. The stream of light-signal pulses can include a light-signal pulse having a center wavelength emission of a first wavelength range of light. The method can also include optically filtering the stream of light-signal pulses at a light-receiving subsystem using a narrow bandpass filter having a center wavelength profile that corresponds with at least the center wavelength emission of the first wavelength range of light. The narrow bandpass filter can exclude background light that is outside of a bandwidth range of light allowed by the narrow bandpass filter. The method can also include receiving the stream of light-signal pulses at a light imager of the light-receiving subsystem after optically filtering with the narrow bandpass filter. In one example, the method can include optically encoding the stream of light-signal pulses with circular polarization at the light source, and also optically decoding the circular polarization of the stream of light-signal pulses at a light-receiving subsystem. In some examples, optically filtering with the narrow bandpass filter can occur after decoding the circular polarization, or can occur before decoding the circular polarization. Additional steps can also include synchronously correlating a light-receiving frequency (e.g., frame rate) of the light imager with a pulse frequency (or pulse modulation frequency) of the stream of light-signal pulses; synchronously correlating includes synchronously receiving, using a polarimetric light imaging assembly at the light-receiving subsystem, the stream of modulated light-signal pulses; synchronously correlating includes emitting the stream of light-signal pulses to include a first wavelength range of light and a second wavelength range of light; or synchronously correlating includes receiving the stream of light-signal pulses including a first wavelength range of light and the second wavelength range of light synchronously at the image light imager.

In these and other example systems and methods of enhancing contrast of light that use filtration, e.g., circular polarization and/or narrow bandpass filtration, if circular polarization is used, there can be for example, encoding and/or decoding of the stream of light-signal pulses using circularly polarizing filter(s) that are oriented to encode and decode using corresponding left- or right-circular polarization. In some examples, the polarizer(s) can be a homogeneous circularly polarizing filter(s). If a narrow bandpass filter is used, as mentioned, the light imager can be optically associated with a first narrow bandpass filter having a center wavelength profile corresponding with a center wavelength emission of the first wavelength range of light. In some examples, the light imager can likewise be optically associated with a second narrow bandpass filter having a center wavelength profile corresponding with a center wavelength emission of the second wavelength range of light.

In these and other example systems of enhancing contrast of light, in operation, the stream of light-signal pulses emitted by the light source can be synchronously correlated with a light-receiving frequency (e.g., frame rate) of the light imager. Thus, in some examples, a reference signal source that generates a reference signal can synchronize the light source and the light imager. The "reference signal source"

can be defined to include a synchronous source from one or both subsystems, e.g., from airfield and/or from aircraft using aviation as an example, or from a remote location, e.g., from a satellite or terrestrial broadcasting or emitting source offsite from the airfield, for example. For example, the reference signal source can locally control the stream light-signal pulses emitted by the light source via wired or wireless communication and remotely control the light-receiving frequency of the light imager via wireless communication. The term "wireless" includes electromagnetic broadcast or emission of carrier electromagnetic waves of any type, e.g., ultraviolet, infrared, visible light, microwave, radar, radio frequency (RF), etc., including both invisible electromagnetic energy of any wavelength, e.g., RF, microwave, radar, etc., that is broadcast or light energy (visible, IR, UV, etc.) that is emitted optically. In one more specific example, the reference carrier signal can be in the form of modulated electromagnetic radiation with a wavelength that ranges from that of the low radio frequency (LF frequency ranges from about 30 kHz to about 300 kHz, or wavelength of 10 km to 1 m) to that of the vacuum ultraviolet (VUV frequencies of 1.5 petaherz (PHz) to 30 PHz or wavelengths of from 10 nm to 200 nm), e.g., wavelengths that cover the range from 10 km to 10 nm. In one example, a light source controller can control the stream of light-signal pulses emittable from the light source, and the reference signal source can receive a pulse frequency (or pulse modulation frequency) corresponding to the stream of light-signal pulses by wired or wireless communication. In further detail, the reference signal source can wirelessly communicate the pulse frequency from an electromagnetic transmitter to the light-receiving subsystem. In still another example, the light-receiving subsystem can further include the reference signal source that locally controls the light-receiving frequency of the light imager or receives the light-receiving frequency from the light imager. Thus, the reference signal source in this example can further wirelessly communicate the light-receiving frequency (corresponding to the emitted pulse frequency) from an electromagnetic transmitter to remotely control the stream light-signal pulses emitted by the light source. In still other examples, the reference signal source can be located remotely with respect to both the light-transmitting subsystem and the light-receiving subsystem. Thus, the reference signal source in this example can control both the stream light-signal pulses emitted by the light source and the light-receiving frequency of the light imager remotely. In still another example, the reference signal source can control the stream light-signal pulses emitted by the light source using a first reference signal oscillator located at the light-transmitting subsystem, and the reference signal source can control the light-receiving frequency of the light imager using a second reference signal oscillator located at the light-transmitting subsystem.

In further detail, and as described in greater detail hereinafter, the light imager can be part of a polarimetric light imaging assembly. Such an assembly may include wavelength retarder, e.g., a multi-wavelength retarder with multiple light-receiving configurations. In further detail, and as described in greater detail herein, the light source can include a first light to emit a first wavelength range of light and a second light to emit a second wavelength range of light. In one example, the second light can operate as a reference signal source for synchronization of the first light with the light imager for enhancing contrast of the first light. In other examples, the first light and the second light can operate in combination with a reference signal source for synchronization of the first light and the second light with the light imager for enhancing contrast of the first light and the second light. The first wavelength range of light can be different than the second wavelength range of light by at least one-half of a first bandwidth of the first wavelength range of light or by at least one-half of a second bandwidth of the second wavelength range of light. With respect to the stream of light-signal pulses, they can be in the form of light in the ultraviolet spectrum, light in the visible spectrum, light in the infrared spectrum, or a combination thereof.

In another example, a system of enhancing contrast of pulsed light can include a polarimetric light imaging assembly, a light source, e.g., an LED light source, to generate a stream of light-signal pulses directed at the polarimetric light imaging assembly, and a control system to synchronously control the light-signal pulses to be emitted from the light source in timed correlation with one or more component of the polarimetric light imaging assembly. The polarimetric light imaging assembly can include, in one example, a multi-wavelength retarder with multiple light-receiving configurations (e.g., a first light-receiving configuration, a second light-receiving configuration, optionally a third light-receiving configuration, etc.), a pixelated filter with pixel apertures to receive pulsed light passed through the multi-wavelength retarder, and an imaging sensor to receive the pulsed light through the pixelated filter. In one more specific example, the polarimetric light imaging assembly can include a pair of polarimetric light imaging subassemblies, with a first subassembly including the multi-wavelength retarder, the pixelated filter, and the imaging sensor. A second polarimetric subassembly can likewise include similar components, namely a second multi-wavelength retarder with multiple light-receiving configurations, a second pixelated filter with pixel apertures to receive pulsed light passed through the second multi-wavelength retarder, and a second imaging sensor to receive the pulsed light through the second pixelated filter.

In this example, the wavelength retarder (or multi-wavelength retarder) can be electrically- and synchronously-controlled to shift the phase of circularly polarized light from right (R) to left (L) polarization or from left (L) to (R) polarization. In this example, the wavelength retarder (or multi-wavelength retarder) can be a half-wave, electrically- and synchronously-controlled retarder to shift the phase of circularly polarized-light from right (R) to left (L) polarization or from left (L) to (R) polarization. Thus, the multi-wavelength retarder can have a configuration that shifts the phase of circularly polarized light, signal one quarter-wave, e.g., shifts by about +/−90°, for example. Alternatively, the multi-wavelength retarder can have multiple configurations that individually shift the wavelength of the light-signal pulse, such as for example i) a positive quarter-wavelength shift, e.g., +90°, and ii) a negative quarter-wavelength shift, e.g., −90°. In one specific example, a third phase can be provided by exhibiting no phase shift in the wave. Quarter-wave shifts can also be used to convert circularly polarized light to linear polarized light. In one specific example that can be used with the wavelength retarders described herein, the light source can emit circularly polarized light through a circularly polarizing filter (optically encoding the light with circularly polarization), and in another example, the polarimetric light imaging assembly can receive the light-signal pulses through a second circularly polarizing filter (decoding the optically encoded light).

The pixelated filter can be, for example, a wire-grid, pixelated polarizer. The pixelated filter can include pixel apertures, which can be arranged in super-pixel aperture sets. For example, a super-pixel aperture set may include multiple pixel apertures, and in one example, there can be four pixel apertures, though other numbers of pixel apertures can be present in a super-pixel aperture set. The various pixel apertures can allow for different angles of polarization to primarily pass therethrough, thus creating intensity differences passing through the various pixel apertures of a super-pixel aperture set, e.g., a first pixel aperture with a 0 degree axis of polarization, a second pixel aperture with a 45 degree axis of polarization, a third pixel aperture with a 90 degree axis of polarization, and a fourth pixel aperture with a 135 degree axis of polarization. The pixel apertures can, in one example, be optically aligned with pixels of the imaging sensor. This particular arrangement allows for potentially a complete Stokes vector of polarization to be generated.

The control system can include a synchronous modulation and power system to cause a stream of modulated light-signal pulses to be emitted from the light source. The control system can also include a synchronous image acquisition controller to control the imaging sensor to convert light-signal pulses received at the imaging sensor to a stream of synchronous digital images. Furthermore, in some examples, the synchronous image acquisition controller can also electrically control the multi-wavelength retarder, e.g., oscillating the retarder between two or more configurations, e.g., −¼ wavelength shift to +¼ wavelength shift (or vice versa), −½ wavelength shift to +½ wavelength shift (or vice versa), 0 wavelength shift to +/− wavelength shift, etc. In one specific example, the control system controls can control both light source and imaging sensor in synchronous correlation with a reference signal. The control system can also control the multi-wavelength retarder in synchronous correlation with a reference signal. The reference signal can be a wirelessly broadcast or emitted carrier reference signal from a local or remote reference signal source, e.g., electromagnetic energy source such as a radio frequency transmitter (microwave, radar, radio frequency, etc.) or a carrier light-signal emitter (ultraviolet light, visible light, infrared light; etc.) from a terrestrial antenna or emitter or a GPS satellite source. In instances where the light source and the polarimetric light imaging assembly are near one another (e.g., chemical detection, etc.), even wired or local wireless electromagnetic signals can be used to control both the light source and the imaging sensor, and in some cases also the polarimetric light imaging assembly.

A light receiver assembly can also be included to optically receive the light-signal pulses directly or indirectly onto the polarimetric light imaging assembly. There can also be a synchronous optical demultiplexer to optically modify light-signal pulses prior to being received by the polarimetric light imaging assembly. For example, in systems with multiple polarimetric light imaging assemblies, a synchronous optical demultiplexer can be used to optically modify light-signal pulses prior to being received by the first polarimetric light imaging subassembly and the second polarimetric light imaging subassembly. The system can include a synchronous optical demultiplexer with a digital micro-mirror (DMD) device to receive the light-signal pulses, and to optically direct the first wavelength range of light and the second wavelength range of light to one or more imaging sensors of the light imager.

In further detail, the light source can be at a fixed position, and the polarimetric light imaging assembly can be on a mobile carrier. For example, the fixed position can be at an airfield, and the mobile carrier can be an aircraft. Alternatively, the light source and the polarimetric light imaging assembly can be on multiple mobile carriers, where one or both are moving. In further detail, the light source and the polarimetric light imaging assembly can both be positioned on a mobile carrier, and the mobile carrier, e.g., aircraft, can use reflection, such as that shown and described in FIG. 5. In essence, the polarimetric light imaging assembly can be used in place of any of the more traditional light imagers shown and described in detail in FIGS. 1, 2, 4, 5, and 8, and then in more detail in FIGS. 9 and 10.

In another example, a system of enhancing contrast of lighting, e.g., LED lighting, can include a light-transmitting subsystem and a light-receiving subsystem. The light-transmitting subsystem can include a light source, e.g. LED light source, a first reference oscillator to receive a reference signal broadcast from a remote source, and a synchronous modulation and power system to cause a stream of modulated light-signal pulses to be emitted from the light source in synchronous correlation with the reference signal. The light-receiving subsystem can include a polarimetric light imaging assembly to synchronously receive the stream of modulated light-signal pulses, a second reference oscillator to receive the reference signal broadcast from the remote source, and a synchronous demultiplexing system to convert the stream of modulated light-signal pulses to a stream of synchronous digital images in synchronous correlation with the reference signal. The system can also include a processor to demodulate and image process the stream of synchronous digital images to provide enhanced contrast display imagery to an output display. In one example, the polarimetric light imaging assembly can include a multi-wavelength retarder with a first light-receiving configuration and a second light-receiving configuration, a pixelated filter with pixel apertures to receive pulsed light passed through the multi-wavelength retarder, and an imaging sensor to receive the pulsed light through the pixelated filter. The polarimetric light imaging assembly can include a pair of polarimetric light imaging subassemblies. In this configuration a first subassembly can include the multi-wavelength retarder, the pixelated filter, and the imaging sensor; and a second subassembly can include a second polarimetric light imaging subassembly including a second multi-wavelength retarder with multiple light-receiving configurations, a second pixelated filter with pixel apertures to receive pulsed light passed through the second multi-wavelength retarder, and a second imaging sensor to receive the pulsed light through the second pixelated filter.

In another example, a method of enhancing contrast of lighting relative to background light can include emitting, using a light source at a light-transmitting subsystem location, a stream of modulated light-signal pulses; and receiving, using a polarimetric light imaging assembly at the light-receiving subsystem location, the stream of modulated light-signal pulses. The method can also include synchronously correlating a power pulse frequency (or pulse modulation frequency) and timing of the light source with a light-receiving frequency (e.g., frame rate) and timing of the polarimetric light imaging assembly. The method can also include demodulating the stream of modulated light-signal pulses synchronously received by the polarimetric light imaging assembly to generate a stream of synchronous digital images; and processing the stream of synchronous digital images to generate enhanced contrast display imagery. In one example, the enhanced contrast digital imagery can be provided as a video image, with the enhanced contrast digital imagery including enhanced contrast of light originating from the pulsed light source relative to background light that did not originate from the pulsed light source. In further detail, the light-transmitting subsystem and the light-receiving subsystem can be at remote locations with respect to one another. The light-transmitting subsystem and the light-receiving subsystem can both be on a mobile carrier, and the method can further include reflecting the stream of modulated light-signal pulses from the light source to the light imager. The step of synchronously correlating can include the use of a common reference signal received by both the light-transmitting subsystem and the light-receiving subsystem.

In still another example, a lighting system can include a light source to emit a stream of light-signal pulses, a transmitter to transmit an electromagnetic signal carrying pulse frequency information as well as one or more of wavelength information, phase information, or duty cycle information related to the stream of light-signal pulses as emitted or emittable from the light source to be used at a remote receiver to control image acquisition of an emitted stream of light-signal pulses. The electromagnetic signal can for example carry the pulse frequency information and the wavelength information, the pulse frequency information and the duty cycle information, the pulse frequency information and the phase information, the pulse frequency information and the wavelength information, the pulse frequency information and two of the wavelength information, the phase information, or the duty cycle information, or the pulse frequency information and the wavelength information, the phase information, and the duty cycle information. The electromagnetic signal can include a digital signal, such as a digital signal carrying digital numbers that sets the pulse frequency of an oscillator at the remote location. Thus, the oscillator can be used to control the image acquisition. The light source can be, for example, an airfield light, and the transmitter can also be located at the airfield. The remote receiver can be included as part of the lighting system in some examples, as the remote receiver can include the equipment used to view the lighting with enhanced contrast. In these examples, the remote receiver can be on an aircraft, for example, such that the light system provides enhanced contrast from the airfield light.

In another example, a method for enhancing lighting contrast at a remote location can include emitting a stream of light-signal pulses from a light source, and emitting an electromagnetic signal carrying pulse frequency (or pulse modulation frequency) information as well as one or more of wavelength information, phase information, or duty cycle information related to the stream of light-signal pulses to be used at a remote receiver to control image acquisition of the stream of light-signal pulses. The details described herein with respect to the lighting system, as well as any other system or method details described herein, can be used with this method to the extent the technologies can be used together.

Turning now to the FIGS., it is understood that the figures presented herein are examples only, and other components can be used in addition to what is shown in accordance with examples of the present disclosure. In other words, the figures are provided for explanatory purposes to aid in the explanation and understanding of the present technology.

In accordance with this and by way of specific example as shown in FIG. 1A, the present disclosure is drawn to a system 10 of enhancing contrast of lighting, e.g., LED lighting which can include a light-transmitting subsystem 20 and a light-receiving subsystem 70. The light-transmitting subsystem can include a light source 50, e.g., an LED light source, and a first reference oscillator 26 to receive a reference signal broadcast from a remote source 22, which in this instance can be a GPS-satellite, but can also be another remote source; e.g., electromagnetic energy source such as an electromagnetic wave transmitter (microwave, radar, radio frequency, etc.) or a light-signal emitter (ultraviolet light, visible light, infrared light; etc.) from a terrestrial antenna or emitter; a GPS satellite source, etc., capable of broadcasting a reference signal a suitable distance to be useful. The light-transmitting system can also include a synchronous modulation and power system 30 to cause a stream of modulated light-signal pulses (LED pulses) to be emitted from the light source in synchronous correlation with the reference signal. The light-receiving subsystem can include a light imager 100 (also referred to as a "light imaging system") to synchronously receive the stream of modulated light-signal pulses, a second reference oscillator 76 to receive the reference signal broadcast from the remote source, and a synchronous demultiplexing system 80 to convert the stream of modulated light-signal pulses to a stream of synchronous digital images in synchronous correlation with the reference signal. For example, a light imager receiving frequency, such as frame rate or rate and/or timing of image information acquisition and clearing, can be synchronized with a pulsed light frequency. The system can also include a demodulation image processor 150 to demodulate the stream of synchronous digital images and to further process the now demodulated digital images to generate enhanced contrast display imagery from the stream of synchronous digital images, and send the processed imagery to an output display 152. The output display is not shown specifically as part of the light-receiving subsystem 70, but in many examples, it can be present on the mobile carrier, or it can be located remotely with respect to the mobile carrier. The terms "demodulation image processor" or "processor to demodulate and image process" a stream of digital images can be used interchangeably, and may include multiple processes or processors, such as for example a processor and/or software to demodulate the demultiplexed images captured by the light imaging system, and an image processor and/or software to generate enhanced contrast display imagery from the digital images that were previously or simultaneously demodulated.

The term "enhanced contrast" relative to display imagery or video imagery or similar, for example, refers to imagery that is generated where light emitted from the Light source, e.g. LED light source, has enhanced contrast (which may have the appearance on a video screen to a viewer as enhanced intensity) relative to background light. In aviation, this type of enhanced contrast display imagery could be referred to by the Federal Aviation Administration (FAA) as an Enhanced Vision System. In demodulating and further processing the enhanced contrast display imagery from the raw, but optically and/or digitally demultiplexed, stream of synchronous digital images, several exemplary steps could occur. For example, a set of sequential or otherwise patterned light imager-captured "optically detectable events" or "scene states" (e.g., LED light "ON" cycles, LED light "OFF" cycles, LED light "ON" with right-circular polarization cycles, second LED light "ON" cycles, etc.) can be collected in a linear or patterned combination of optically detectable events or scene states, and each scene state can be assigned a coefficient value. Affirmative LED light scene states (various "ON" optically detectable events) that are captured can be assigned a positive or negative coefficient value. In some examples, a background LED light scene state ("OFF" event) can also be used and given a negative coefficient value to subtract out the background light, e.g., −1, −2, etc. These coefficients can be assigned to enhance contrast. In one example, it may be desirable to assign the lights a brighter color or white, and the background color a darker color or black. This could, of course, be reversed with lights assigned a darker color or black and the background assigned a brighter color or white. This could be the way that the image is viewed, or the display could be configured to view the image in a negative view, thus correcting the inversely light contrasted imagery. Then, the linear combination of images with their coefficients can be mathematically processed using least squares regression analysis, or a maximum likelihood method, for example. Once demodulated in this manner and processed to use two or more of these scene states (typically per cycle) to provide the enhanced contrast imagery information from the light source, the imagery can be outputted to a video screen for viewing, either alone or with other collected video imagery. In some examples, the processing can include combining the enhanced contrast imagery with more standard imagery captured by lenses and/or imaging sensors similar to standard videography equipment, or in other examples, the enhanced contrast imagery can be combined or fused with various types of symbology, e.g., avionics symbology, or infrared enhanced imagery of the ground (or other area where a mobile carrier operator may be looking), or other types of imagery that would be useful to a mobile carrier operator, e.g., an in-cockpit pilot, a remote aircraft pilot, a ship captain or crew, a train operator, etc.

It is further noted that in FIG. 1A, 1B, and FIGS. 2, 3, 4, etc., hereinafter, dashed arrows are used generally to depict a pulsed light-signal as opposed to a control, power, or data signal, which is shown using solid lines. More specifically, dashed directional arrows are generally used to indicate a pulsed optical signal (ultraviolet, visible, or IR), such as the stream of modulated light-signal pulses described in accordance with the present disclosure. Solid line arrows, on the other hand, typically depict an electrical or other control/power signal (wired or wireless) that is used to control and/or power the synchronous emission of pulsed LED light at the light-transmitting subsystem, or to synchronously control/power various optical demultiplexers, light imagers and their imaging sensors thereof, image processing after imaging, etc., at the light-receiving subsystem. Furthermore, the signal sent by the remote source, e.g., satellite or terrestrial source, is shown using broken and dotted lines, indicating an electromagnetic signal that may or may not be at or near the light spectral region, but that is distinguishable in function from the optical light-signal used to send modulated light or optical information between subsystems. In the specific example of FIG. 1A, the dashed lines are shown connecting the light source 50, e.g., LED light source, to the light imager 100, but there are examples where the optical filters and/or synchronous optical demultiplexer(s) can also be used to process the optical signal prior to being received by the light imager, as described in more detail hereinafter. For example, the reference signal can be a wirelessly broadcast or emitted reference signal from a local or remote reference signal source, e.g., electromagnetic energy source such as an electromagnetic energy transmitter (microwave, radar, radio frequency, etc.) or a light-signal emitter (ultraviolet light, visible light, infrared light; etc.) from a terrestrial antenna or emitter or a GPS satellite source.

The terms "synchronous correlation," "synchronous," "synchronize," or other similar terms, refer generally to various systems, subsystems, and/or individual components within a subsystem that can be harmonized together so that the equipment therein operates or is configured to operate in agreement with other systems, subsystems, and/or individual components. This agreement can include light-transmitting pulse frequency (or pulse modulation frequency), light-receiving frequency (e.g., frame rate) agreement, and relative timing agreement, but can also be supplemented with wavelength agreement, intensity agreement, radiance agreement, bandwidth agreement, phase agreement, polarization agreement, etc. For example, on a system level, a light-transmitting subsystem can operate or be configured to operate in synchronous correlation with a light-receiving subsystem, thereby matching (or operationally matching) certain light-transmitting properties from any of a number of categories with corollary light-receiving properties in a synchronous manner. As a specific example, by matching the timing and light-signal pulse frequency (or pulse modulation frequency) from the LED light(s) of an LED light source with the timing and light-receiving frequency, e.g., frame rate or image acquisition/clearing rate, of the imaging sensor (s) of a light imager, synchronous correlation can be said to have occurred. In further detail, additional synchronous optical devices can also be present at either or both of the light-transmitting subsystem and/or the light-receiving subsystem. For example, a synchronous optical multiplexer can be present at the light-transmitting subsystem and/or a synchronous optical demultiplexer can be present at the light-receiving subsystem. These are optical devices that can be used in addition to the LED light(s) used to transmit the light-signal and the imaging sensor(s) used to receive the light-signal. Regardless of how many systems or devices are being operated in synchronous correlation with one another, they can be synchronized, in one example, using a common reference signal of some type (particularly with bistatic systems) to coordinate all of the light-transmitting and light-receiving subsystems (and components thereof) synchronously together. With monostatic systems, on the other hand, where all of the devices may be present on a single mobile carrier, e.g., with light retro-reflection being used, synchronous correlation between the various light-transmitting and light-receiving subsystems (and components thereof) can be correlated by more direct communication onboard the mobile carrier, though in some instances a common reference signal can also be used. As a note, whether referring to a "relative high frequency signal" that is broadcast as a "reference signal," or referring to a synchronous relative low frequency signal converted therefrom, both of these two types of signals can be themselves correlated with one another in a synchronous manner, and thus, it is accurate to refer to any of the systems, subsystems, device components, and/or software described herein as being "synchronously correlated" with either type of signal, e.g., reference signal and/or synchronous relative low frequency signal(s), as well as to any other system, subsystem, component device, and/or software that is also operated synchronously therewith. That being said, there may be examples where individual component devices are operated with different timings, phases, gate times, pulse frequencies, wavelengths, etc., but are still operated to synchronously function or operate together in order to enhance imagery contrast. For example, a synchronous image acquisition controller can be said to be in synchronous correlation with a GPS reference signal, even though the synchronous image acquisition controller is used to convert the reference signal to one or more synchronous relative low frequency signals that may be used to control two different components, e.g., two different imaging sensors. Thus, in accordance with examples of the present disclosure, by internally and individually synchronizing the respective subsystems and relevant components thereof, and by also synchronizing the two subsystems to one another (such as by using a remote reference signal or some other communication common to both subsystems), the systems of the present disclosure can be operated "synchronously" with enhanced lighting contrast relative to background light.

Some components that are synchronous components may on occasion be referred to explicitly as "synchronous" and on other occasions without the "synchronous" preface, and thus, the context can dictate whether a component is a synchronous component or merely a passive optical device, like a passive filter or lens, for example. To illustrate, a "synchronous wavelength demultiplexer" may be referred to as a "wavelength demultiplexer" in some occasions, but in context describes active optical separation controlled by a synchronous image acquisition controller, and thus, this demultiplexer is understood to be synchronous. Likewise, the synchronous image acquisition controller has multiple functions, one of which includes synchronously controlling a light imager. Thus, the image acquisition controller can sometimes be referred to simply as an "image acquisition controller," and is still considered to be a synchronous component (or system).

In further detail, two devices can be considered to be in synchronous correlation with one another, even if some or all of the properties of the correlation do not match exactly. For example, an LED light may emit during 50% of the time of a single duty cycle, whereas the imaging sensor used to gather the light emitted from the LED light may be in a capturing mode for only 40% of the time during that same duty cycle. These two components would still be considered synchronized with one another because they would still be configured to operate together synchronously to enhance image contrast. Thus, terms like "match," "frequency matched," "synchronously matched," or the like, do not infer exact matching, but rather operational matching that results in improved image contrast performance.

The term "reference signal" refers to a signal from a local or remote source, such as a remote broadcasting source, e.g., electromagnetic energy source such as an electromagnetic wave transmitter (microwave, radar, radio frequency, etc.) or a light-signal emitter (ultraviolet light, visible light, infrared light; etc.) from a terrestrial antenna or emitter or a GPS satellite source, etc. The reference signal can be received at the respective subsystems by a "reference oscillator," e.g., one at the light-transmitting subsystem and one at the light-receiving subsystem for bistatic systems, or one at the mobile carrier where both subsystems are onboard for monostatic systems. By both subsystems using the same reference signal, both subsystems can be synchronized together based on the common reference signal. Typically, a reference signal that is very stable and has frequency that is relatively high can be converted to a more useable relatively low frequency signal(s) for purposes of controlling the respective subsystems and synchronous devices of the present disclosure. An example of a reference oscillator is a quartz or rubidium oscillator that can be used to receive timing and other reference signal information from various types of sources, e.g., electromagnetic energy source such as an electromagnetic wave transmitter (microwave, radar, radio frequency, etc.) or a light-signal emitter (ultraviolet light, visible light, infrared light; etc.) from a terrestrial antenna or emitter or a GPS satellite source, etc. With a satellite (GPS) source, a GPS-disciplined reference oscillator can be used. Once the relative high frequency signal is received from the remote broadcasting source, the reference signal can be down converted using an intermediate device such as a synchronous modulation signal generator (at light-transmitting subsystem) or an image acquisition controller (at light-receiving subsystem) to form one or more synchronous relative low frequency signals at each subsystem location.

Notably, the satellite "remote or broadcasting source 22" shown in FIGS. 1A and 2-4 as a GPS satellite reference source is for example purposes only. For example, and as shown in further detail in FIG. 1B, the remote or broadcasting source can likewise be some other electromagnetic source, such as an antenna, shown by example at 22A, that provides a synchronization signal to one or both of the light-transmitting subsystem 20 and/or the light-receiving subsystem 70. The synchronization signal could be, for example, from a terrestrial broadcasting source that sends the signal to both the light-transmitting subsystem (wired or wireless) and the light-receiving subsystem (wireless in this example). In those instances, the first reference oscillator could operate as described in FIG. 1, example. Alternatively, as shown by example also in FIG. 1B, one of the light-transmitting subsystem or the light-receiving subsystem can establish the synchronous information, such as at 26A at the light-transmitting subsystem, and the synchronous information can be provided to the broadcasting or emitting source shown at 22A in this example to be sent to the light-receiving subsystem for synchronization. The opposite arrangement can likewise occur, where the light-receiving subsystem establishes the synchronous information and emits or broadcast that information to the light-transmitting subsystem for synchronization. The other reference numerals shown and described in FIG. 1B can be as described in FIG. 1A to the extent applicable to the example shown in FIG. 1B, with the main exception being where the synchronization timing is established, e.g., established at broadcasting or emitting source to be sent to both subsystems, or alternatively, established at one of the subsystems to be sent to the other subsystem, etc.

Figure 1B:
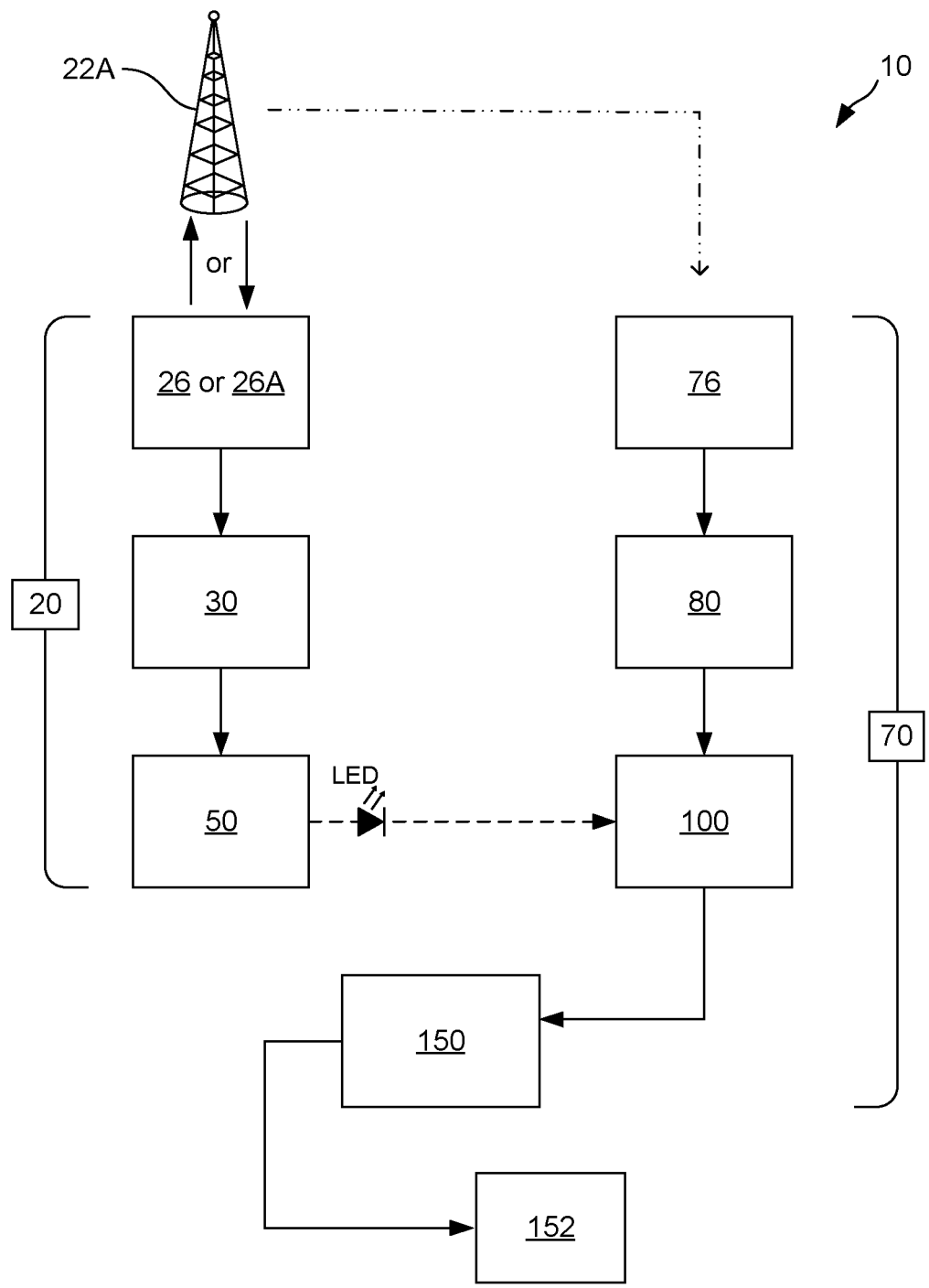
FIG. 1B is a component diagram of an alternative example system for enhancing contrast of lighting in accordance with the present disclosure.

A more specific example of the system shown in FIG. 1B would be the implementation of this system at an airfield to be used with aircraft. There, the synchronous signal could be established by the light-transmitting subsystem (or received from a synchronization broadcasting source), and the synchronization information can be carried or could be modulated to be carried by an existing RF signal at an airport. As an example, currently at airports, a radio signal is amplitude modulated (AM). Thus, a subcarrier on any AM channel could be established that would broadcast a synchronizing transmission (or pick a dedicated channel). In one example, an aircraft could be programmed to scan for the synchronous signal of the closest airport, or the signal could be dialed in by the pilot, as pilots currently are accustomed to doing for weather reporting or for receiving navigation data, e.g., a synchronous signal could be carried using one or more of the navigation frequencies already reserved at airports for radio-based navigation, which are becoming less commonly used due to GPS moving map technologies. Alternatively, a unique new frequency could be established that is either universal to a class of airports or each airport could have its own territorially unique specific frequency, similar to a unique weather broadcast commonly broadcast from airports. In further detail, a broadcast from an airport, such as a weather broadcast, could be modified with a subcarrier signal to be carried with the existing broadcast.

Alternatively, rather than using radio frequency or some other longer wave frequency, lighting could be used to carry the synchronous signal to send to the synchronous aircraft, such as the lighting shown and described herein or separate lighting fixtures to operate similarly as the antenna shown in FIG. 1B. With low visibility conditions, synchronous light may not travel as far as a radio frequency signal, and thus, synchronization may not occur much in advance of the enhanced visibility lighting established on a display, but this could occur well prior to standard visibility of the naked eye. In accordance with this, a light-signal used to send the synchronous signal from the light-transmitting subsystem to the light-receiving subsystem (or vice versa), could be any type of light that can travel through poor atmospheric conditions, e.g., infrared light or even visible light or UV light in some instances. Furthermore, when using light for the reference signal, the light used can be modified to travel further or with more "visibility" using any of the systems described herein for enhancing visibility, e.g., pulsed light, wavelength modulation, circular polarization, narrow band-pass filtration, optical multiplexing and demultiplexing, or any other light modulation technique described herein or which is known.

It is notable that an electromagnetic synchronization reference signal (e.g., RF, visible light, IR, microwave, radar, etc.) can be broadcast from a remote site relative to both the light-transmitting subsystem and the light-receiving subsystem, but can also be broadcast from either the light-transmitting subsystem and/or the light-receiving subsystem. This is for purposes of synchronization. Even if the reference signal is a light-signal, this should not be confused with the light that is emitted as a stream of pulsed light that is used to provide enhanced contrast visibility. That light-signal is transmitted, in most cases, from the light-transmitting subsystem to be received by the light-receiving subsystem for purposes of providing enhanced contrast visibility at the light-receiving subsystem. As an example, in the case of an aircraft and airfield, even though the stream of light-signal pulses used to establish enhanced visibility is set up to emit light from the airfield (e.g., runway, airport lighting, etc.) to the aircraft, the synchronization electromagnetic reference signal (e.g., visible light, IR light, RF, microwave, radar, etc.) can originate from anywhere, e.g., the airport, the aircraft, space, an offsite terrestrial antenna, etc. If light (UV, IR, visible) is used for the synchronization reference signal originating at the light-transmitting subsystem, the reference signal light can be emitted from a separate light than is used to emit the stream of light-signal pulses for enhanced visibility. Alternatively, the same lights can be used that are used to send the stream of light-signal pulses for enhanced visibility. For example, a discrete short digital signal in the form of light pulses or some other signaling system could be emitted to provide the synchronization information to the aircraft. This digital information could be repeated periodically, sent to the aircraft by request from the pilot, or sent by request automatically by the aircraft, for example. Once the synchronization information is received by the aircraft, the stream of light-signal pulses (e.g., from one or multiple LED lights) can be synchronized with the imaging sensor(s) on the aircraft to provide the enhanced contrast visibility described herein.

Whether broadcasting the electromagnetic reference signal from an antenna, or emitting the electromagnetic reference signal from a light source, the broadcasting or emitting system can be used to replace the GPS-disciplined oscillator and global-positioning system shown by example in FIGS. 1-4 and described elsewhere herein. Instead, in the case of a longer wave signal that is broadcast, like RF, microwave, radar, etc., a transmitter and an antenna could be used. If present at the light-transmitting subsystem, in one example, the LED light pulse frequency (or pulse modulation frequency) could be provided to the transmitter (wired or wireless) to be broadcast to the light-receiving subsystem, or alternatively, an oscillator or other clock circuitry could establish the pulse frequency to be sent to both the light-transmitting subsystem (wired or wireless) and the light-receiving subsystem (wireless broadcast). In some examples, an LED or lighting wavelength-control circuit could be used to control power to the lighting emissions at the light-transmitting subsystem. Such a circuit could be used, for example, to alternatively activate the longer-wavelength light of a lighting pair, and then the shorter-wavelength light, and so forth (assuming multiple lights for wavelength modulation examples). A signal from the lighting wavelength-control circuit could be sent to the RF transmitter, which would then send out a first signal (e.g., tone 1) when the longer-wavelength light was activated and a second signal (e.g., tone 2) when the shorter-wavelength light was activated. In the case of a single light, e.g., one LED light, only one tone may be used to synchronize the single light pulse frequency.

The term synchronous "relative low frequency signal" refers to one or more signal generated by a signal generator (described as a synchronous modulation signal generator at the light-transmitting subsystem, or as a synchronous image acquisition controller at the light-receiving subsystem). The synchronous relative low frequency signal can be electromagnetically transmitted wirelessly or by using electrical wires and can be processed appropriately using various types of circuitry or devices that may be implemented to control the Light source, e.g. LED light source, via its power supply controlled by the synchronous modulation signal generator at the light-transmitting subsystem and/or the light imager via the image acquisition at the light-receiving subsystem. To illustrate, at the light-transmitting subsystem, by way of example, the synchronous relative low frequency signal can be further synchronously encoded using processors or circuitry relative to the type of LED light pattern that is to be emitted (and ultimately synchronously received) in accordance with systems of the present disclosure. For example, at the light-transmitting subsystem, the synchronous relative low frequency signal (which by definition includes multiple synchronous relative low frequency signals) generated by the synchronous modulation signal generator can be used to synchronously generate a pattern (of any type) of power pulses to one LED light or independently to two or more respective LED lights; or to generate power pulses of varying radiance, e.g., 0% (OFF), 50% or some other fractional radiance (ON), and 100% (ON) to one or more LED lights; or to synchronously control a synchronous optical multiplexer, such as an electro-optically actuated homogeneous circularly polarizing filter; etc. At the light-receiving subsystem, decoding of the LED light-signal can occur using the synchronous relative low frequency signal (or multiple signals) generated by the synchronous image acquisition controller, which can be used to control light imager frame rate(s) for one or more imaging sensors, e.g., image acquisition and clearing timing, or to control a synchronous optical multiplexer timing or gating, or both. Thus, these multiple devices or types of devices can be controlled by one relatively low frequency signal or by multiple synchronous relatively low frequency signals, and in both circumstances this can generically be referred to as "a (first or second) synchronous low frequency signal."

The terms synchronous "modulation signal generator" and synchronous "image acquisition controller" can be considered analogous component devices used with two different subsystems for controlling synchronous light-transmitting activity (at or near the ground in the case of landing sites, or at other relevant target locations with respect to other mobile carrier fields) and synchronous light-receiving activity (within an aircraft or other mobile carrier), respectively. In many examples, both can be used to down convert the relatively high frequency signal received by a reference oscillator (from a remote or broadcasting source) to a synchronous relatively low frequency signal(s). Furthermore, however, the synchronous modulation signal generator (using one or more of its down converted synchronous relatively low frequency signals) can control, for example, synchronization of LED light-signal transmissions, e.g., pulses frequencies, wavelength emissions, radiance of emissions, phases, optical multiplexing devices such as oscillatory polarizers, etc. The synchronous image acquisition controller (using one or more of its down converted synchronous relatively low frequency signals), on the other hand, can control light imager frame rate(s) for one or more imaging sensors, e.g., cyclical image acquisition and clearing, optical multiplexer timing or gating, etc. The common reference signal, which can be used by both the synchronous modulation signal generator and synchronous image acquisition controller at both respective subsystems, can allow for synchronization between the two subsystems generally, and more specifically, from component devices and/or software to other component devices and/or software that may be present throughout the system as a whole where operation would benefit from synchronization. In monostatic systems, the common reference signal can be used as well, but in some examples, more direct communication between the two subsystems and/or individual component devices and/or software within each subsystem can alternatively be used.

The term synchronous "optical multiplexer" and synchronous "optical demultiplexer" each refer to any optical device that can synchronously channel or filter light when operated using a synchronizing signal, or when otherwise synchronized through more direct communication. The optical multiplexer can be associated with the light-transmitting subsystem, and more particularly in some examples, can be optically associated with the Light source, e.g. LED light source, in some manner, e.g., synchronous polarization multiplexer, synchronous bandpass multiplexer, etc. The optical demultiplexer can be associated with the light-receiving subsystem, and more particularly, in some examples, can be optically associated with the light receiver assembly and/or the light imager, e.g., synchronous wavelength demultiplexer such as a synchronously controllable digital micro-mirror (DMD) device, synchronous polarization demultiplexer such as a synchronously controllable homogeneous circularly polarizing filter, synchronous bandpass filtration, etc. These multiplexers and demultiplexers can be said to be "active" optical devices that are "electro-optically" operated or actuated (which includes electromechanically optically actuated devices). Thus, the term "synchronous" also indicates that a particular device is an "active" optical device that may be electro-optically actuated, where applicable.

The term "passive" associated with certain optical devices indicates that the specific device is not synchronized by the synchronous systems, subsystems, component devices, or software described herein. It can work together with synchronous components, but of itself, is not a synchronous device. These optical devices, however, can provide enhanced transmitting and/or receiving properties to the stream of light-signal pulses described herein, including providing passive encoding and decoding of information, bandwidth filtration, polarization to remove background light or noise light, optics to collimate or expand light-signal pulses, optics to redirect or split light-signal pulses, etc. Examples of a few passive optical devices can include beam splitters (color separation beam splitters), reflectors (mirrors, parabolas, etc.), beam expanders, light refractors (prisms, etc.), polarizers, bandpass filters, etc., that are not optically active or electro-optically synchronously controlled per se, but that can still be used to provide enhanced optical properties, or in some specific arrangements, can be used in conjunction with an active demultiplexer or even as part of a passive optical demultiplexer arrangement, e.g., a beam splitter used to separate a stream of modulated light-signal pulses into two beams, each of the now separated beams passing through a narrow bandpass filter appropriately selected to correspond with one (or the other) of two wavelengths of light.

Figure 2:
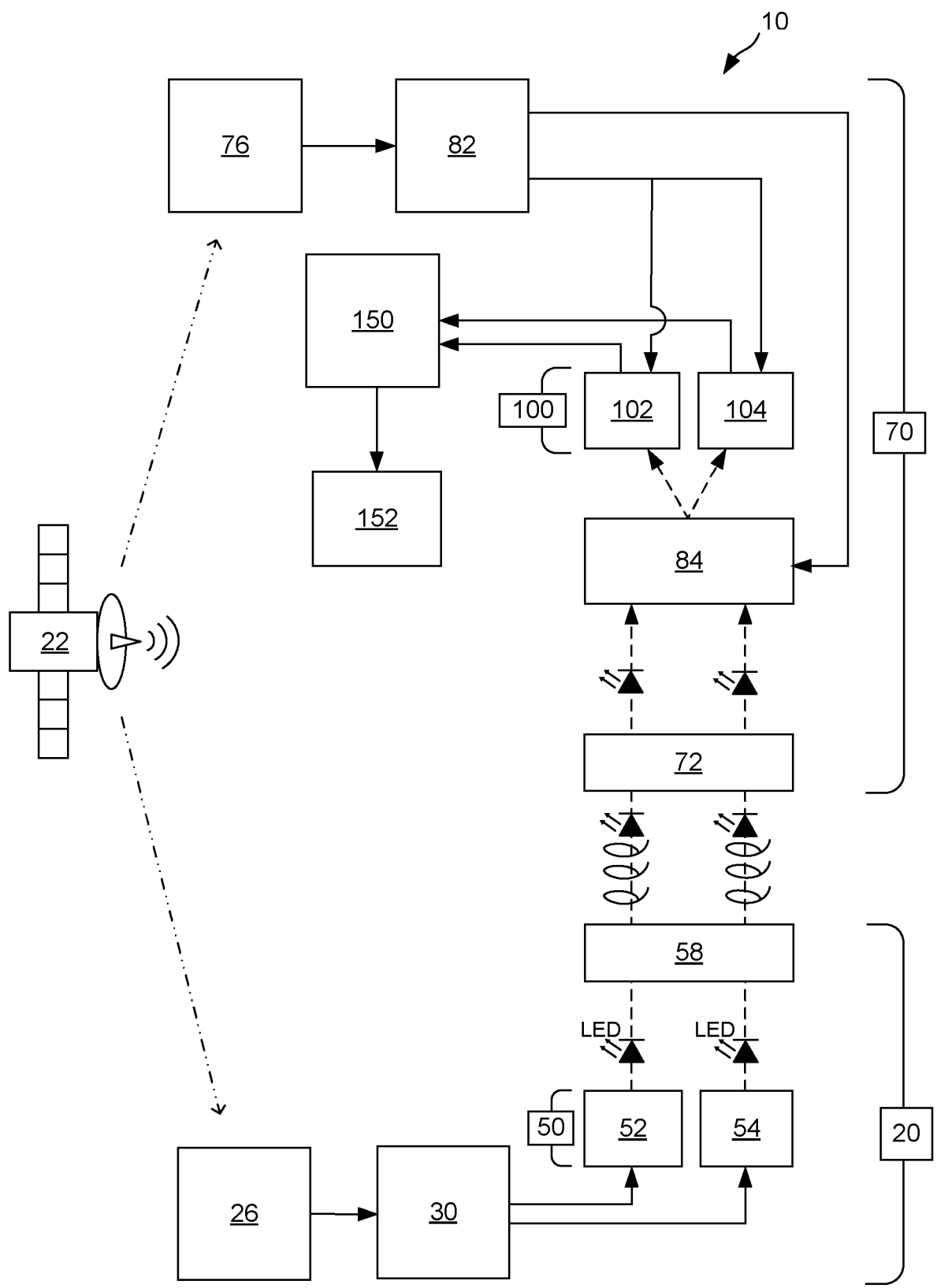
FIG. 2 is a component diagram of an example system for enhancing contrast of lighting, including example light-transmitting and light-receiving optics associated with sending and receiving a stream of modulated light-signal pulses in accordance with the present disclosure.

Returning now to the FIGS., in another more specific example, and as shown in FIG. 2, a system 10 of enhancing contrast of lighting relative to background light can include a light-transmitting subsystem 20 and a light-receiving subsystem 70. The light-transmitting subsystem can include a light source 50, e.g., LED light source, that includes a first LED light 52 to emit a first wavelength range of light with a first center-emission wavelength, and a second LED light 54 to emit a second wavelength range of light with a second center-emission wavelength that is offset from the first center-emission wavelength. This light-transmitting subsystem can also include a first reference oscillator 26, which can be a first GPS-disciplined oscillator, to receive a reference signal broadcast from a remote or broadcasting source 22, which in this example can be a GPS satellite. Also included in this example light-transmitting subsystem is a synchronous modulation and power system 30 which, for example, can include a synchronous modulation signal generator (not shown, but shown in FIG. 3) to convert the reference signal from a synchronous relatively high frequency signal to a first synchronous relatively low frequency signal, and to provide synchronized power pulses to the first LED light and the second LED light in synchronous correlation with the first synchronous relatively low frequency signal to generate a stream of modulated light-signal pulses that includes a first (pulse modulation frequency) wavelength range of light and a second (pulse modulation frequency) wavelength range of light. (A stream of modulated-light-signal pulses can include two wavelengths of light, the stream collectively can also be said to include a modulated wavelength signal that can be demultiplexed and demodulated at the receiving end of the system). Thus, in this example, the stream of modulated light-signal pulses can include a signal that is both intensity and wavelength modulated. In one example, the synchronized power pulses can be generated, in part, by a DC power converter, e.g., LED DC power converter, and a power controller (not shown, but more specifically shown in FIG. 3). The light-transmitting system can also include, for example, an output optic (not shown, but shown in FIG. 3) to collimate the stream of light-signal pulses, and in other examples, a first polarizing filter 58 can be optically associated with the light source to optically encode the light with circular polarization, e.g., a homogeneous circularly polarizing filter, to be decoded with a second circular polarizer 72 at the light-receiving subsystem. Both of these optical features will be described in greater detail hereinafter. A narrow bandpass filter (or multiple narrow bandpass filters) (not shown, but shown by example in FIG. 8) can also be used at the light-receiving subsystem to allow the stream of light-signal pulses through, while rejecting background light outside of the range allowed by the profile of the narrow bandpass filter.

In further detail regarding the system shown in FIG. 2, the light-receiving subsystem 70 can include a light receiver assembly (not shown, but shown in FIGS. 4 and 8) to optically receive the stream of modulated light-signal pulses from the light source, e.g., LED light source, and a light imager 100 to receive the stream of modulated light-signal pulses from the light receiver. In one example, the light imager can include a first imaging sensor 102 to sense the first modulated wavelength range of light and a second imaging sensor 104 to sense the second modulated wavelength range of light. In another example, a single imaging sensor can likewise be configured to receive and independently detect both wavelengths of light. In still another example, there may be only one light source 52 (without 54) and one imaging sensor 102 (without 104). This system may not have the benefit of wavelength modulation, but could still include pulsed light and synchronous imaging, and further contrast could be generated using polarization shown in this FIG. and/or a narrow bandpass filter shown at 78A in FIG. 8. In other words and by way of example, if one LED light source, two LED light sources (or more), one imaging sensor, or two imaging sensors (or more) are used, additional contrast can be achieved using various types of filtration, including encoding filtration, decoding filtration, wavelength filtration, etc. Thus, other optical devices can also be included, such as, for example, a passive second polarizing filter 72 and/or a synchronous optical demultiplexer 84, e.g., electro-optical actuated synchronous homogeneous circular polarizer or a synchronous wavelength demultiplexer. An example synchronous wavelength demultiplexer can include a synchronous digital micro-mirror (DMD) device for optically separating or optically demultiplexing multiple wavelengths of light by directing the stream of light along one or more optical paths and delivering it (or each path) to one or multiple imaging sensors, which may also include passing the optical paths through one or more optical filters, e.g., narrow bandpass filters, prior to delivery to the imaging sensor(s). The light-receiving system can also include a second reference oscillator 76, such as a GPS-disciplined oscillator, to receive the reference signal broadcast from the remote or broadcasting source 22, which can be a GPS satellite in this example.

A synchronous demultiplexing system (shown at 80 in FIG. 1A, but shown as a series of individual component devices in this example) can also be present, which essentially includes the various synchronous component devices that interact with the light imager in the collection of light imagery emitted from the light-emitting subsystem, e.g., a synchronous image acquisition controller 82, and in this specific example, a synchronous optical demultiplexer. The synchronous image acquisition controller can have several functions, including converting the reference signal received by the second reference oscillator from a relatively high frequency signal to a synchronous relatively low frequency control signal(s), and to cause the stream of modulated light-signal pulses to be converted to a stream of synchronous digital images in synchronous correlation with the second synchronous relatively low frequency signal. For example, the synchronous image acquisition controller can also be used to control the timing and the light-receiving frequency, or frame rate, to match or otherwise synchronize with the timing and pulse frequency (or pulse modulation frequency) of emitted light. In some examples, when a synchronous optical demultiplexer 84 is present (to optically interact with the stream of modulated light-signal pulses prior to being received by the light imager), the image acquisition controller can also synchronously control this device component. To illustrate, in one example, a first imaging sensor 102 of a light imager 100 can be synchronized with pulses of light, e.g., emitted from a first LED light, having a first wavelength, and the second imaging sensor 104 can be synchronized with pulses of light, e.g., emitted from a second LED light, having a second wavelength. The image acquisition controller can thus act to synchronize the timing frequency or frame rate of the respective light imagers to coordinate with the pulse frequency of the lights. Furthermore, in this example, the image acquisition controller can also time or otherwise synchronize a synchronous optical demultiplexer, which in this instance can be an optical wavelength demultiplexer, e.g., for separating the two wavelengths of light for example by synchronously channeling the respective wavelengths of light to the appropriate imaging sensor. An optically appropriate narrow bandpass filter (not shown herein, but shown in FIG. 8) may also be present at one or both imaging sensors.

In further detail, the system 10 of enhancing contrast of lighting, e.g., LED lighting, can also include a processor 150 to demodulate and image process a stream of digital images received by the light imager and further process the image to generate enhanced contrast display imagery as previously described. The system can also include an output display 152, which may typically be on the mobile carrier, but in one example, can be transmitted to a remote location, such as to a remote drone pilot location, for example.

Figure 3:
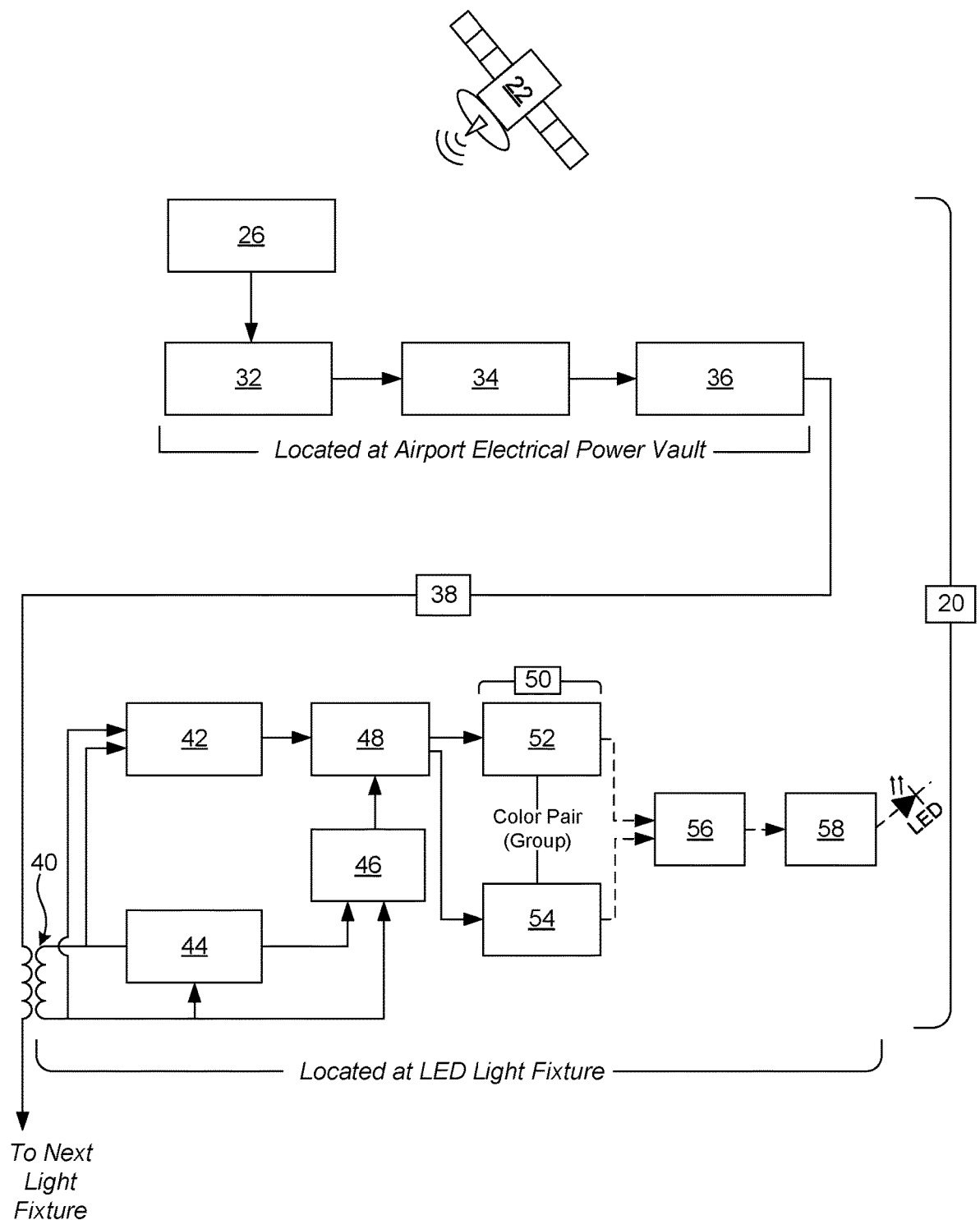
FIG. 3 is a component diagram of a more specific example of an airport-based light-generating subsystem of a bistatic airport and aircraft lighting system in accordance with the present disclosure.

In another more specific example and as shown in detail in FIG. 3, an airport-based, light-transmitting subsystem 20 can include a light source 50, e.g., LED light source, including for example a first LED light 52 to emit a first wavelength range of light with a first center-emission wavelength, and a second LED light 54 to emit a second wavelength range of light with a second center-emission wavelength that is offset from the first center-emission wavelength. This system also includes a reference oscillator 26, which can be a GPS-disciplined oscillator to receive a reference signal broadcast from a remote or broadcasting source 22, which can be a GPS satellite in this example. The light-transmitting system can also include a synchronous modulation and power system (which collectively includes multiple device components in this example) including a synchronous modulation signal generator 32 as well as other circuitry and devices such as those shown at reference numerals 34-48. As these components represent one specific manner of configuring and installing a synchronous modulation and power system, they will be described hereinafter by way of specific example only. In short, however, the synchronous modulation and power system can be operated to convert (or synchronously down convert) a synchronous relatively high frequency signal to a synchronous relatively low frequency signal(s), and to provide synchronized power pulses to a first LED light and a second LED light, for example, in synchronous correlation with the synchronous relatively low frequency signal in order to generate a stream of modulated light-signal pulses that include a first modulated wavelength range of light and a second modulated wavelength range of light. Also shown in FIG. 3 by way of specific example, is an output optic 56 and a first polarizing filter 58, which will be described in greater detail hereinafter.

Figure 4:
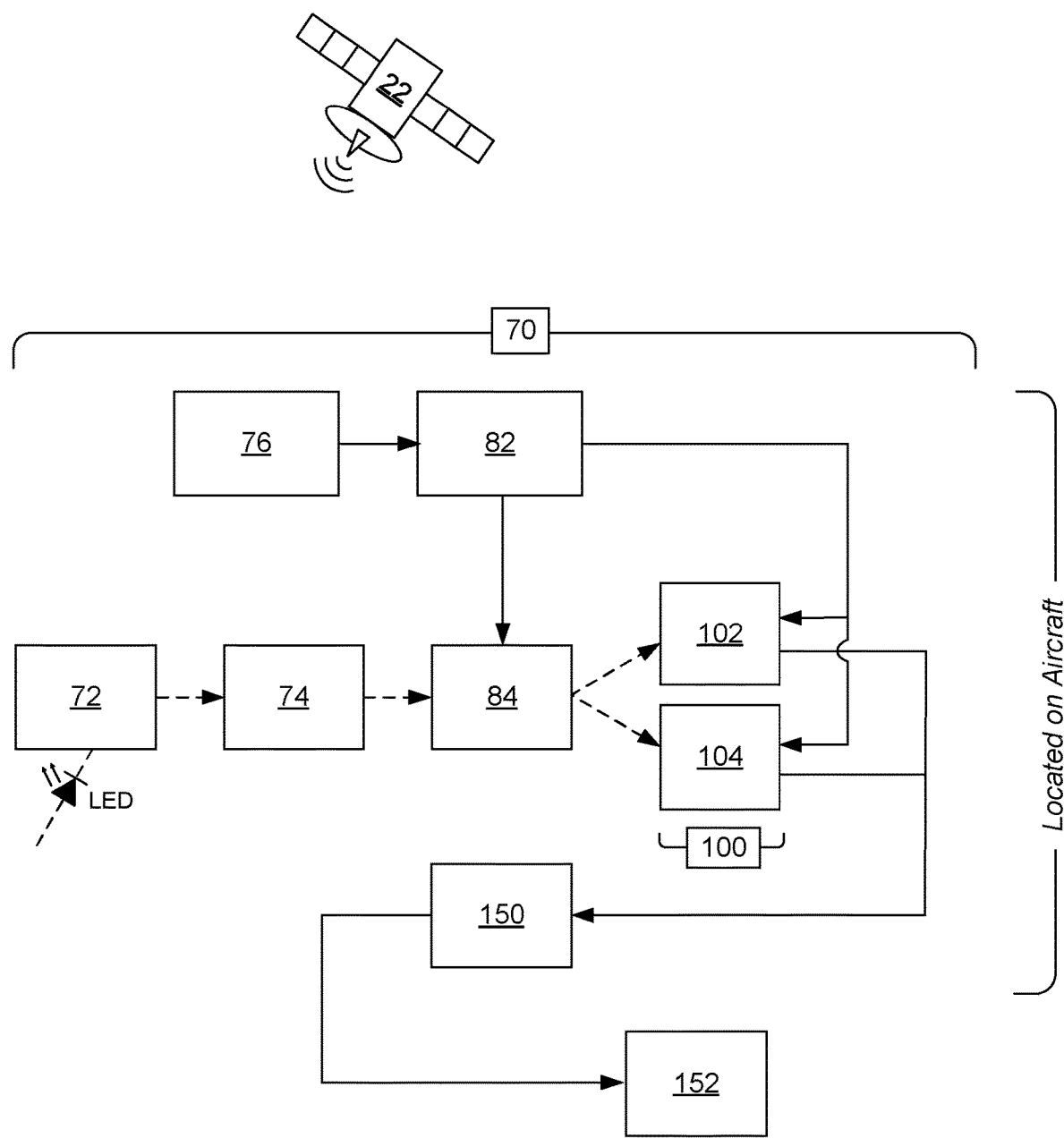
FIG. 4 is a component diagram of a more specific example of an aircraft-based light-receiving subsystem of a bistatic airport and aircraft lighting system in accordance with the present disclosure.

In yet another more specific example and as shown in detail in FIG. 4, an aircraft-based, light-receiving subsystem 70 can include a light imager 100, and a light receiver assembly 74 to optically receive and focus a stream of modulated light-signal pulses from a light source, e.g. LED light source, directly or indirectly onto the light imager. The stream of modulated light-signal pulses can include a first wavelength range of light and a second wavelength range of light. In some specific examples, the light imager may include only a (single) first imaging sensor 102, or it can include two or more imaging sensors, e.g., a first imaging sensor 102 and a second imaging sensor 104. As a note, the imaging sensors can be independently powered and/or controlled by the image acquisition controller, or can be commonly powered and/or controlled using common circuitry. In either case, both imaging sensors can be part of a light imager (or "light imaging system"), and thus, the term "light imager" should not be read to necessarily infer a common device per se, but rather a system that includes various circuitry and one or more imaging sensor(s), for example. For example, two imaging sensors can be included in a common device, or can be in two spatially separated devices that work collectively together. In both instances, the imaging sensors would still be considered to be part of the light imager or light imaging system. Furthermore, the imaging sensors of the light imager can be any of a number of imaging arrays that are useful for capturing light, including CMOS sensors, a CCD sensors, hybrid CCD/CMOS sensors (such as sCMOS sensors and other know hybrid sensors), etc.

The light-receiving subsystem 70 can also include a second reference oscillator 76, which in this case can be a GPS-disciplined oscillator to receive a reference signal broadcast from a remote or broadcasting source 22, which can be a GPS satellite in this example. A synchronous image acquisition controller 82 can be present to convert the reference signal from a synchronous relatively high frequency signal to a synchronous relatively low frequency signal(s). Additionally, the synchronous image acquisition controller can be used to convert the stream of modulated light-signal pulses synchronously received by the light imager (using one or more of the relatively low frequency electrical signal(s) to provide synchronization) to a stream of synchronous digital images generated from the first wavelength range of light and the second wavelength range of light (synchronously captured by the first imaging sensor 102 and the second imaging sensor 104, respectively). Thus, this synchronous demultiplexing can occur in accordance with and in agreement with the relatively low frequency electrical signal also generated by the synchronous image acquisition controller. Furthermore, shown in this FIG. is a second polarizing filter 72 and a synchronous optical demultiplexer 84, each of which being described in greater detail elsewhere hereinafter. Furthermore, the subsystem can also include a processor 150 to demodulate and image process a stream of digital images received by the light imager and further process the image to generate enhanced contrast display imagery as previously described. The system can also include an output display 152, which may typically be on the mobile carrier, but in one example, can be transmitted to a remote location such as to a remote drone pilot location, for example.

Figure 5:
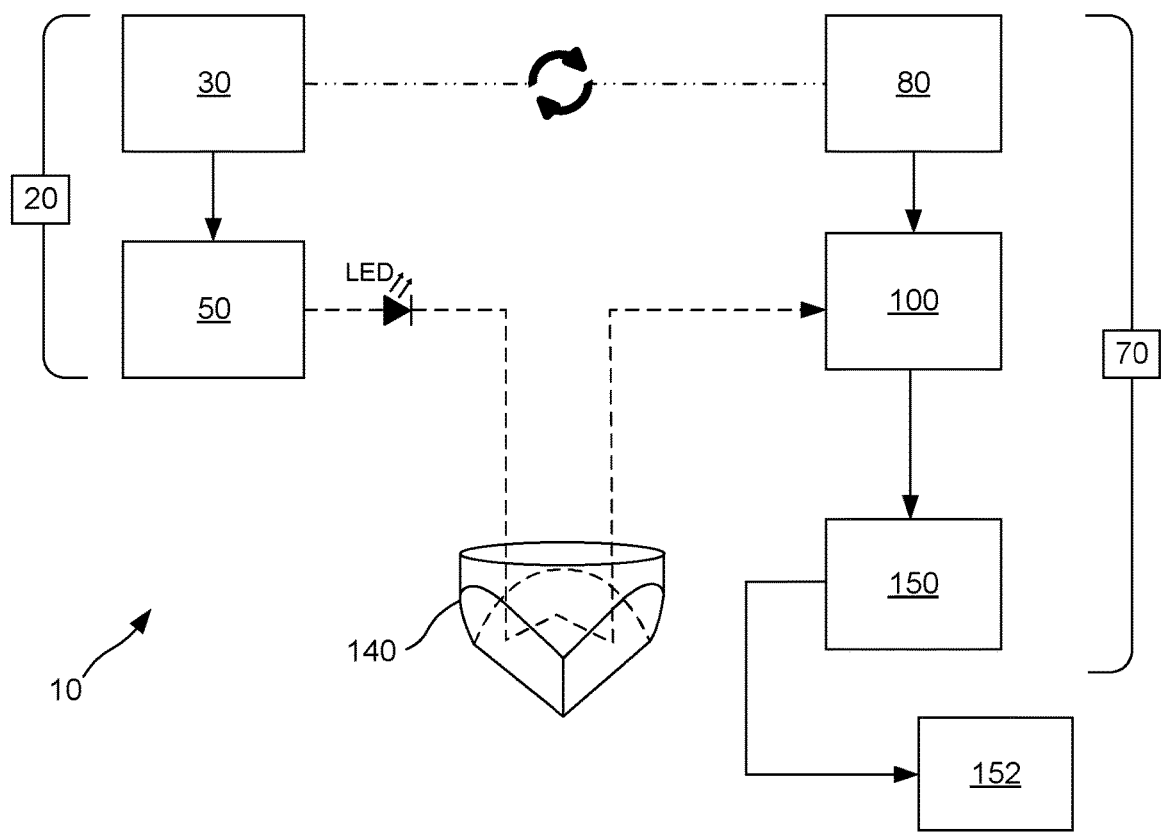
FIG. 5 is a component diagram of an example system for enhancing contrast of lighting using a monostatic mobile carrier lighting system in accordance with the present disclosure.

In another example, as shown generally in FIG. 5, a system 10 of enhancing contrast of reflected lighting, e.g., lighting such as LED lighting, on a mobile carrier (shown collectively as containing both subsystem 20 and subsystem 70) such as an aircraft, a water vessel, a land vehicle, a train, etc., can include a light-transmitting subsystem 20 and a light-receiving subsystem 70, both positioned on the mobile carrier. The light-transmitting subsystem can include a light source 50, e.g., LED light source, and a synchronous modulation and power system 30 to power and generate a stream of modulated light-signal pulses from the light source in a first direction. The light-receiving subsystem 70 can include a light imager 100 to receive the stream of modulated light-signal pulses reflected from the first direction, and a synchronous demultiplexing system 80 to convert the stream of modulated light-signal pulses to a stream of synchronous digital images. In this example, the synchronous modulation and power system and the synchronous demultiplexing system can be configured so that when in operation, the stream modulated of light-signal pulses is synchronously timed and pulse frequency (or pulse modulation frequency) matched with the timing and light-receiving frequency (e.g., frame rate) of the light imager. A processor 150 (or demodulation image processor) can be used to demodulate a stream of digital images captured by the light imager and to image process the demodulated stream of images to provide enhanced contrast display imagery. In one example, the system can further include a retroreflector 140, such as a corner cube reflector, for receiving the stream of modulated light-signal pulses and reflecting the stream of light generally back from the retroreflector in the opposite direction. Generally, a corner cube reflector is a retroreflector that includes three mutually perpendicular flat surface panes that can reflect electromagnetic waves back toward the source.

The monostatic system of FIG. 5 can include many of the other specific device components, filters, software, etc., as described with any of the other bistatic systems. However, because both subsystems may be present on a common mobile carrier, there may be instances where a reference oscillator may not be present, or only a single reference oscillator may be present that controls both subsystems, for example. Furthermore, as with the bistatic examples, various types of filtration, polarization, and other optical enhancing components can be used as well, provided they can be acceptably used with a retroreflector or with other reflective systems. For example, circularly-polarized light may not reflect back in the same manner as originally emitted, and thus, adjustments can be made to the reflected polarized light, or a different type of polarization may be selected, such as linear polarization. As another example, though not specifically mentioned above, the synchronous demultiplexing system 80 may include an image acquisition controller that down converts a reference signal as previously described, or may otherwise communicate with the light-transmitting subsystem for synchronization therewith. The synchronous demultiplexing system can also control the light imager 100, including any imaging sensors thereof, controlled by the image acquisition controller, or can also include one or more optical demultiplexers that synchronously and optically process light prior to light imager synchronous capture, or can include any of a number of active or passive filters or other optical devices, e.g., beam splitters, micro-mirrors, etc.

Figure 6:
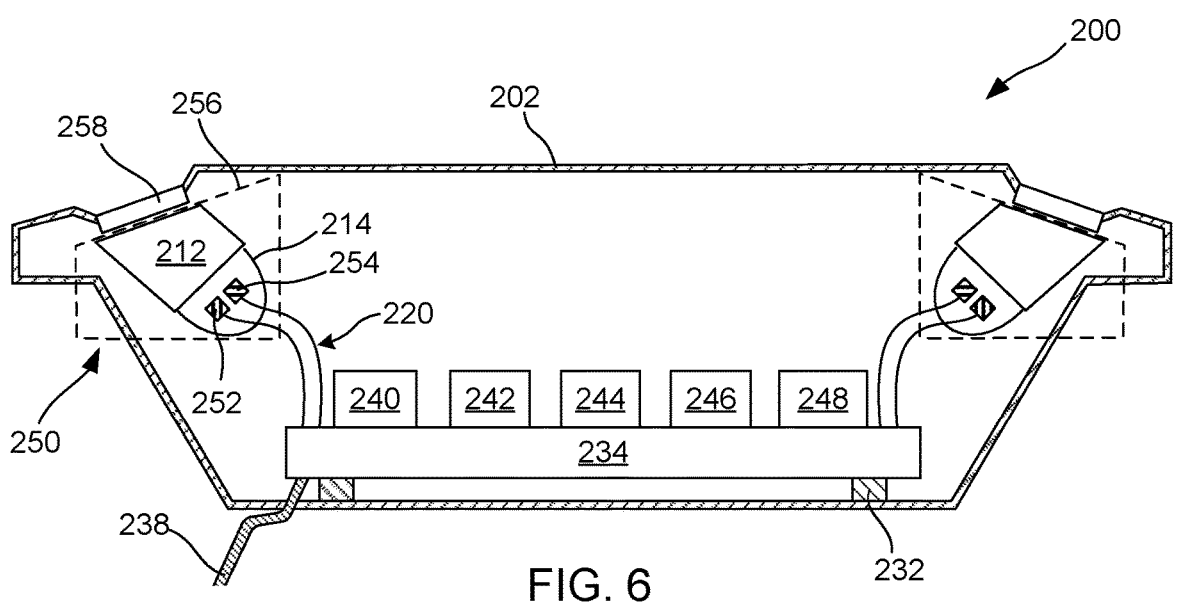
FIG. 6 is a diagram of an example runway LED light fixture adapted for use with the example bistatic lighting systems in accordance with an embodiment of the present disclosure.

In another example, as shown in FIG. 6, an LED light assembly 200 suitable to connect to an airfield series lighting loop 238 can include a fixture housing 202, an LED light source 250, and a synchronous modulation and power system, which can include one or more of the circuitry or devices shown as reference numerals 240, 242, 244, 246, and 248, for example. The light source can generate a stream of modulated light-signal pulses as a collimated beam of light in an upwardly angled orientation generally within a range of incoming aircraft glide path angles, e.g., about 2 to 4 degrees from horizontal for some commercial aircraft jetliners with landing speeds from 100 to 140 knots, or about 4 to 12 degrees for certain small aircraft with landing speeds ranging from 30 knots to 100 knots, for example. Other fixed wing aircraft that do not fit into these general categories can also benefit from the systems of the present disclosure. That being stated, an angular range of upwardly angled light-signal orientation from about 2 degrees to about 15 degrees should be wide enough to be effective for most types of fixed wing aircraft. As a note, the term "LED light" includes any solid state light, including omnidirectional LED lights, laser diodes, super radiant diodes, or the like. Thus, if the objective is to provide emitted light commensurate with a reasonable glide path range of a fixed wing aircraft, e.g., 2 to 15 degrees, 2 to 12 degrees, 2 to 10 degrees, 3 to 10 degrees, etc., then appropriate output optics can be associated with a particular type of solid state light source or solid state light-emitting diode, as may be appropriate. For example, an omnidirectional LED light can be collimated with an elliptical mirror and prism to focus or concentrate omnidirectional light. A laser diode, on the other hand, can utilize optics to widen a more inherently narrow beam of light, such as an optical beam expander. As a further note, angular modification of the direction of the beam of light-signal can be made for landing sites based on the intended aircraft or other carrier vehicle. For example, if being used for a helicopter, the angle of the beam can be adjusted commensurate with an often intended steeper approach angle.

In further detail, the light source can include a first LED light 252 and a second LED light 254 to generate the stream of modulated light-signal pulses. As mentioned, with each of the varied types of LEDs described above, the optics associated therewith can be accordingly modified as may be appropriate. Thus, the light source can include an output optic 256 to modify the stream of modulated light-signal pulses, which in this instance can concentrate the signal to form a collimated beam of light. For example, the output optic can include a parabolic reflector 214 and a prism 212 to collimate the stream of modulated light-signal pulses. If the LED light is a laser or other narrow light beam source, then a beam expander could be used rather than collimating optics. A first polarizing filter 258, such as a homogeneous circularly polarizing filter (passive or synchronous) can also be included to encode the stream of modulated light-signal pulses with circular polarization.

In another example, the synchronous modulation and power system generally can include an isolation transformer 240 to transfer and limit AC electrical power received from the airfield lighting loop, an DC power converter 246 to convert the AC electrical power received through the isolation transformer to DC electrical power, and a synchronous power controller 248 to control emission timing and pulse frequency (or pulse modulation frequency) of the pair of LED lights in a coordinated and synchronously modulated pattern. Other features can include an electromagnetic interference filter 244 onboard the LED light assembly to filter out unwanted interference, and/or a power line-carrier communications modem 242. The circuitry or devices can be carried by a circuit board 234, such as a printed circuit board, supported by a standoff insulator 232, and electrically coupled to the light source by LED power leads 220.

As shown in FIG. 6, but not specifically notated with reference numerals, is a second LED light source electrically coupled to the synchronous modulation and power system as well. The second LED light source can be configured to generate a second stream of modulated light-signal pulses as a second collimated beam of light in an upwardly angled orientation generally within a second range of incoming aircraft glide path angles. The second LED light source can include a second pair of LED lights, e.g., a third LED light and a fourth LED light, to generate the second stream of modulated light-signal pulses and a second output optic to concentrate the second stream of modulated light-signal pulses to form the second collimated beam of light. Thus, for example, the LED light source and the second LED light source can generate two diverging beams of light pointed in opposite directions along an x-axis to provide runway lighting in both directions along a single runway.

Figure 7:
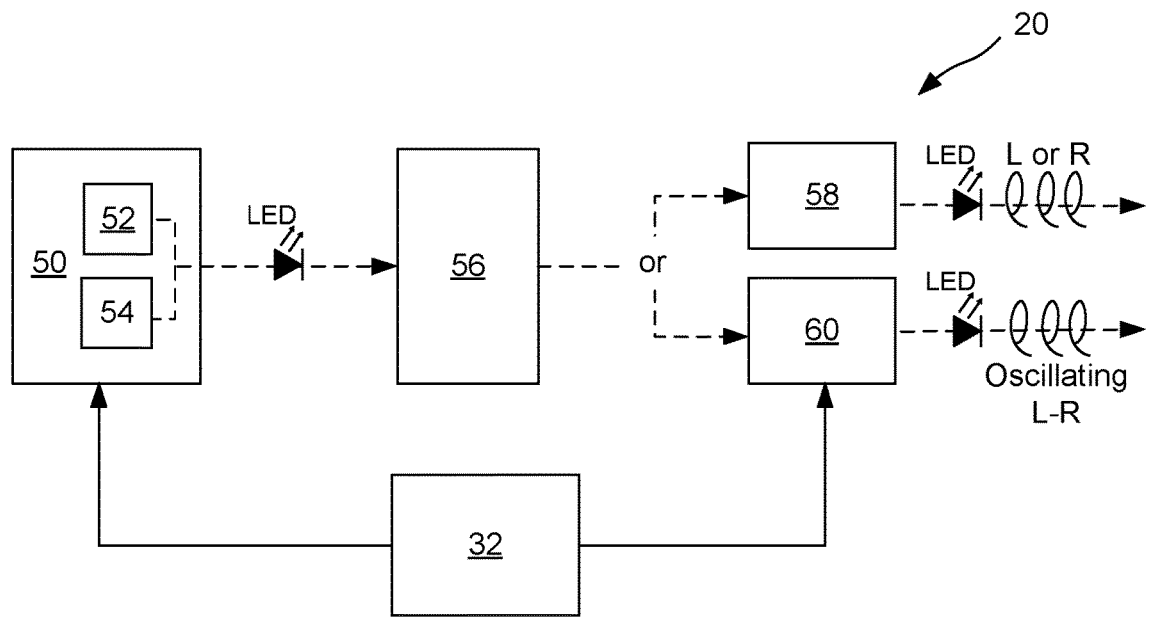
FIG. 7 is a component diagram of a more specific example of certain optics associated with a light-generating subsystem in accordance with the present disclosure.
Figure 8:
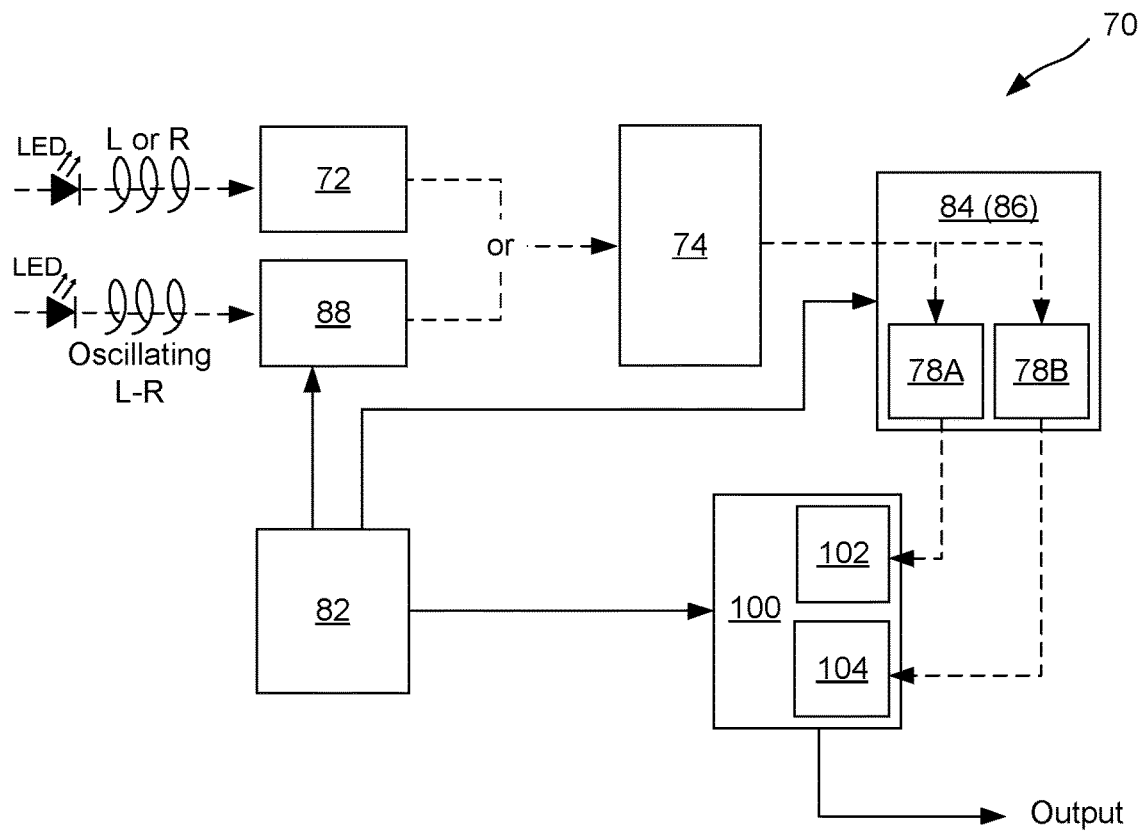
FIG. 8 is a component diagram of a more specific example of optics associated with a light-receiving subsystem in accordance with the present disclosure.

In another example, a more specific embodiment detailing example optical encoding and decoding (modulating and demultiplexing) of the stream of light-signal pulses is shown in FIGS. 7 and 8. FIG. 7, for example, provides a portion of a light-transmitting subsystem 20, detailing an example where a light source 50, e.g., LED light source, includes a first LED light 52 and a second LED light 54, for example, that is adapted to emit a stream of modulated light-signal pulses that include a first wavelength range of light (from the first LED light) and a second wavelength range of light (from the second LED light). The stream of modulated light-signal pulses can be encoded with time and pulse modulation frequency where the first LED light cycles between "ON" and "OFF," and the second LED light cycles between "ON" and "OFF." This can be an alternating pattern with little or no temporal overlap, or a more complex pattern, e.g., different radiances, differently timed cycles, three or more lights, different polarizations, etc., which can be controlled by the synchronous modulation and power system, and more specifically in this example, by a synchronous modulation signal generator 32. The stream of modulated light-signal pulses can be collimated to concentrate and provide directionality to the light using an output optic 56. On the other hand, if a laser or other type of solid state light source is used that has a narrow beam, a beam expander could be used as well to generate a wider beam. In further detail, the light source can be optically associated with a first (passive) polarizing filter 58, such as a circularly polarizing filter or an homogeneous circularly polarizing filter; or the light source can be optically associated with an electrically actuated, synchronous homogeneous circularly polarizing filter 60, which essentially acts as a synchronous polarization multiplexer to be demultiplexed at the light-receiving subsystem, which can be electrically oscillated between left- and right-circular polarization. The electrical actuation can be achieved by replacing a quarter-wave-plate retarder of the polarizing filter with an electrically-driven half-wave plate photoelastic modulator to generate the stream of modulated light-signal pulses (with alternating right- and left-circular polarization).

Thus, encoding can occur by synchronously cycling one or more light pulses (on/off), synchronously cycling one or more light intensities (e.g., on high, on low, off), synchronously cycling left and right circular polarization, etc.

FIG. 8 provides further example detail regarding optics and decoding of the stream of light-signal pulses received at the light-receiving subsystem 79. In this example, polarized light can be received by a second polarizing filter 70, which in this example is a circularly polarizing filter or a right- or left-homogeneous circularly polarizing filter, to decode or allow to pass light with similar polarization applied to the stream of light-signal pulses from the first polarizing filter 58 (FIG. 7). In an alternative example, a second (light-receiving) synchronous polarization demultiplexer 88 can be used in synchronous correlation with the (light-transmitting) synchronous homogeneous circularly polarizing filter 60 (or synchronous polarization multiplexer of FIG. 7). This second synchronous homogeneous circularly polarizing filter can be synchronously controlled by the synchronous demultiplexing system, or more specifically as shown in FIG. 8, a synchronous image acquisition controller 82, which is also synchronously coordinated or correlated with the synchronous modulation signal generator 32 (FIG. 7). In further detail, a light receiver assembly 74 receives and focuses the stream of modulated light-signal pulses toward a synchronous optical demultiplexer 84, which in this instance can be a synchronous wavelength demultiplexer 86 since there are two wavelengths of light within the stream of modulated light-signal pulses. The synchronous wavelength demultiplexer can be an electro-optical device that can also be synchronized as part of the synchronous demultiplexing system, such as with the image acquisition controller. Essentially, the synchronous wavelength demultiplexer can optically separate the first wavelength range of light from the second wavelength range of light by timing the respective pulses of light from each wavelength. In one example, optically separated wavelengths of light-signal pulses can be further processed by narrow bandpass filters, 78A and 78B, to filter and/or narrow the bandwidth of the respective wavelengths of light for delivery to the light imager 100, which is also synchronously controlled by the synchronous demultiplexing system (and more specifically the image acquisition controller, in one example). Thus, the optically separated wavelengths of light can be respectively delivered and synchronously received by a first imaging sensor 102 and a second imaging sensor 104. In other examples, however, a single imaging sensor can be used that can be synchronously timed and sensitive to both wavelengths of light. As mentioned, the synchronous demultiplexing system can include a synchronous image acquisition controller which can also control the light imager and any synchronous optical demultiplexers that may be used, including in this example, the synchronous wavelength demultiplexer 86.

As shown in FIG. 8, both circular polarization and a narrow bandpass filter are used in a common system of enhancing the contrast of lighting. Circular polarization can be particularly helpful in improving light penetration though visibility-reducing atmospheric conditions, such as fog, smog, dust, smoke, storms, etc. The narrow bandpass filter, on the other hand, can also improve lighting contrast by improving equipment efficiency, filtering out background light that is not within the wavelength range that the bandpass filter profile is configured to accept. Thus, each can be used with improvements in enhancing lighting contrast, but using both together provides typically an even larger effect. Such systems can even work well on bright days with a lot of ambient background light or intense light scattering, as may be present with snow or advective fog, for example. As circularly polarized light does not exist in nature, it is a good way to transmit (optically encode) light and then receive (optically decode) that light in a selective manner Coupling circularly polarizing filters as described herein with narrow bandpass filtration provides even more lighting discernment against undesirable background lighting that may be present.

In another example, a method of enhancing contrast of lighting relative to background light can include emitting, using a light source, e.g. LED light source, at a light-transmitting subsystem location, a stream of modulated light-signal pulses; receiving, using a light imager at the light-receiving subsystem location, the stream of modulated light-signal pulses; and synchronously correlating a power pulse frequency (or pulse modulation frequency) and timing applied to the light source with light-receiving frequency (e.g., frame rate) and timing applied to the light imager. Additional steps can include demodulating the stream of modulated light-signal pulses synchronously received by the light imager to generate a stream of synchronous digital images and processing the stream of synchronous digital images to generate enhanced contrast display imagery. In this specific example, the enhanced contrast digital imagery can be provided as a video image that includes enhanced contrast lighting originating from the LED light source, for example, relative to background light that did not originate from the LED light source. The light-transmitting subsystem and the light-receiving subsystem can be at remote locations with respect to one another, or both can be on a mobile carrier, and the method can further comprise reflecting the stream of modulated light-signal pulses from the LED light source to the light imager, e.g., using a retroreflector such as a corner cube reflector. The step of synchronously correlating the power pulse frequency with the light-receiving frequency can include the use of a common reference signal.

In each of these system and method examples, whether specifically mentioned or not, the light-transmitting subsystem and the light-receiving subsystem (or corresponding method step) can include synchronous or passive polarizers (or polarization) for synchronously or passively encoding/decoding the stream of modulated light-signal pulses. The polarizer filters can be circularly polarizing filters that are oriented the same way to allow both sending and receiving the same light polarization. The first circularly polarizing filter can be optically associated with the light, e.g. LED light, (or when two or more LED lights are used in an LED light pair or group, one or more of the first LED light or the second LED light). The second circularly polarizing filter can be optically associated with the light receiver assembly (which may include a first imaging sensor and a second imaging sensor). For example, the first circularly polarizing filter can optically encode the stream of modulated light-signal pulses with right- and left- (or right- or left-) circularly-polarized light, and the second circularly polarizing filter can accept and decode the right- and left- (or right- or left-) circularly-polarized light applied to the stream of modulated light-signal pulses while rejecting unpolarized or linearly-polarized light. If a synchronous polarization demultiplexer is used, a corresponding synchronous polarization multiplexer at the light source, e g. LED light source, can also be used and oscillated in a coordinated manner. In another example, a synchronous polarization multiplexer (optically associated with the LED light source) or a synchronous polarization demultiplexer (optically associated with the light imager) can be used in conjunction with a passive right- or left-polarizer to generate light "pulses" from a light emission, even a continuous light emission. For example, by oscillating right- and left-polarization at either the transmitting or receiving end, a passive polarizer at the other end would only allow for light transmission/reception when the polarization is matched, and would reject light when the polarization is out of phase.

It is also noted that when discussing the contrast enhancing systems and related methods herein, each of these discussions can be considered applicable to other examples whether or not they are explicitly discussed in the context of that example. Thus, for example, when discussing a GPS-disciplined oscillator in the context of an contrast enhancing system, such disclosure is also relevant to and directly supported in the context of various methods and other similar examples that also may use a GPS-disciplined oscillator, and vice versa.

Furthermore, for simplicity and illustrative purposes, the present disclosure is described by referring mainly to examples in aviation, including civilian and military aviation, fixed wing aircraft, helicopters, and other aviation aircraft. However, these same principles can be implemented in other contexts, such as in civilian or military land vehicle and/or maritime applications, including offshore oil rigs and underwater exploration and construction operations, etc. Thus, any specific reference to aviation, airfields, aircraft, etc., is intended to provide direct support for other contexts, including those where there is a moving mobile carrier with a light-receiving subsystem onboard, and any type of second remote (bistatic) or even onboard (monostatic) light-transmitting subsystem location, e.g., water vessel and ports, obstructions, or open sea; train and train station; underground mining operation; fire and other rescue endeavors; land vehicle and safety or navigation lighting; etc. In other words, any vehicle or mobile carrier with a monostatic system onboard, or any vehicle or mobile carrier with the light-receiving subsystem portion of the bistatic system onboard where there is a corresponding light-transmitting subsystem available for use, can benefit from the systems and methods disclosed herein. Furthermore, in the following description, numerous specific details are set forth in order to provide a thorough understanding of the present disclosure. It will be readily apparent, however, that the present disclosure can be practiced without limitation to many of these specific details. In other instances, certain methods, structures, or applications are not specifically described in detail so as not to unnecessarily obscure the present disclosure.

In further detail, when referring generically to an "airport," this includes, by definition, controlled airports, uncontrolled airports, airstrips, heliports, aircraft carrier landing areas, water landing areas, open field landing areas, or any other area where aircraft of any type may land, for example. Likewise, the term "aircraft" includes any type of aircraft, including fixed wing aircraft, helicopters, paragliding or hang-gliding apparatuses, hot-air balloons, ultralights, spacecraft, rockets, seaplanes, airships, drones, or the like.

With these general examples in mind, as mentioned, the present disclosure is drawn generally to lighting contrast enhancing systems (relative to back ground lighting) and methods for improving the visibility of lighting, such as LED lighting, which can be particularly useful in low visibility conditions, e.g., visibility-reducing atmospheric conditions such as fog, smog, dust, smoke, storms, etc. Thus, because lighting contrast enhancement can be provided using various technological solutions, various forms of "light" (such as various wavelengths of light in various spectral regions, or various pulsing frequencies, or various polarizations, etc.), can be used that may not be otherwise visible or distinguishable to the naked eye. For example, in addition to light, e.g., LED light, that can emit visible light, e.g., from about 400 nm to about 700 nm, other light spectral regions can be used, including ultraviolet (UV) light, e.g., from about 100 nm to about 400 nm; or infrared (IR) light, e.g., near to short-wave IR from about 700 nm to about 2500 nm; or short-wave to mid-range IR from about 2500 nm to about 5000 nm. In some systems, near IR can be defined as about 700 nm to about 1400 nm, short-wave IR can be defined as about 1400 nm to about 3000 nm, and mid-range IR can be defined as about 3000 nm to about 8000 nm.

In specific examples of the present disclosure, the contrast enhancing systems and methods can exploit one or more key photonic properties of solid state diode lights, including (1) the potential for rapid on/off switching (e.g., in less than 10 microseconds); (2) stable peak emission wavelengths (with less than 2% drift); and/or (3) narrow-bandwidth emissions (relative to the wavelength selected for use).

With respect to rapid on/off switching, pulse frequencies can be selected for use with light sources, e.g., LED light sources, that are above the visual flicker fusion rate for the human eye, which is about 100 Hz. The flicker fusion rate represents a pulse frequency (or pulse modulation frequency) where most humans would not perceive that a light is cycling or pulsing. For example, films cycle at about 30 frames a second and high frame rate films cycle at about 60 frames per second. Most computer monitors have a refresh rate of about 60 Hz, and high end monitors have a refresh rate of 120 Hz. Thus, rapid on/off switching above about 100 Hz is typically fast enough to be imperceptible by most humans Example ranges for pulse frequencies (and corresponding light imager receiving frequencies) can be from 100 Hz to 130,000 Hz, from 100 Hz to 48,000 Hz, from 100 Hz to 1000 Hz, from 100 Hz to 500 Hz, from 150 Hz to 48,000 Hz, from 150 Hz to 1000 Hz, from 150 Hz to 500 Hz, from 200 Hz to 1000 Hz, or from 200 Hz to 500 Hz, for example. Thus, for definitional purposes, when referring to a "reference signal," e.g., electromagnetic energy source such as an electromagnetic wave transmitter (microwave, radar, radio frequency, etc.) or a light-signal emitter (ultraviolet light, visible light, infrared light; etc.) from a terrestrial antenna or emitter or a GPS satellite source, etc., the term "relative high frequency signal" refers to frequency signals that are greater than 130,000 Hz, and typically much greater than 130,000 Hz, e.g., more than a full order of magnitude, such as about 10 MHz. Thus, the "relative low frequency electrical signal" that is down converted from the relative high frequency signal can be frequency signals from 100 Hz to 130,000 Hz, and more typically from 100 Hz to 48,000 Hz.

Regarding the stable peak emission wavelengths, stable wavelengths can provide the ability to send and receive predictable wavelengths of light with any appropriate optical equipment, including appropriate narrow bandpass filters, and appropriate light imagers suitable for receiving the wavelengths of light at or near the peak emission wavelength. This can be particularly beneficial when emitting and receiving multiple wavelengths of light within the stream of modulated light-emitting pulses. For example, a light source, e.g. LED light source, can include a first LED light to emit a first wavelength range of light and a second LED light to emit a second wavelength range of light that is different than the first. In this example, the first wavelength range of light can include a first bandwidth and a first center-emission wavelength, and the second wavelength range of light can include a second bandwidth and a second center-emission wavelength. Thus, the first center-emission wavelength can be offset from the second center-emission wavelength by at least one-half of the first bandwidth or the second bandwidth, which can be the narrower of the two bandwidths, or the broader of the two bandwidths. The two wavelengths of light can be in the visible region, the infrared region, the ultraviolet region, or in any two different regions, e.g., visible and infrared, visible and ultraviolet, infrared and ultraviolet. In further detail, two or more wavelengths of light can be used (with two or more LED lights positioned immediately proximal to one another, e.g., within about 2 cm), to generate a color group that pulses and generates an average perceived color that can be any color that is desired, such as the colors of light typically used in air or sea navigation, e.g., white, red, green, amber, yellow, or blue light. As an example, red light, green light, and blue light can be combined to generate white light; or blue light and yellow light can be combined to generate white light. For clarity, the term "perceived color" refers to human viewers using their natural eyes without added equipment. The equipment of the present disclosure, on the other hand, can distinguish between the two or more wavelengths of light being emitted, even if they are not perceptible to the human eye. That is one reason why the two or more wavelengths of light can be emitted, e.g., so that the light-receiving subsystem can distinguish the two wavelengths and use that added information to generate the enhanced contrast images described herein. The perceived color, on the other hand, is generated for use primarily during normal visibility conditions where pilots (or other vehicle operators in other circumstances) may use color or white light for general navigation or other purposes without the systems of the present disclosure.

With respect to bandwidth more specifically, in the visible spectral region, a bandwidth, e.g., full width at half maximum intensity, for the stream of modulated light-signal pulses can be emitted at an optical bandwidth of 50 run or less, or 40 run or less, 30 run or less, or 25 nm or less, for instance. In the infrared spectral region, a bandwidth for the stream of modulated light-signal pulses can be 200 nm or less, 150 nm or less, 100 run or less, or 50 nm or less. For example, in the near-infrared spectral region, the bandwidth can be 80 nm or less, 60 nm or less, or 40 nm or less; in the short-wave infrared spectral region, the bandwidth can be 100 nm or less, 75 nm or less, or 50 nm or less; and in the mid-wave infrared spectral region, the bandwidth can be 200 nm or less, 150 nm or less, or 100 nm or less, for example. In the ultraviolet spectral region, a bandwidth for the stream of modulated light-signal pulses can be emitted at a bandwidth of 20 nm or less, 10 nm or less, or 10 nm or less. The "center wavelength emission" can be any peak wavelength within the bandwidth. Thus, for example, if the optical bandwidth is from about 450 nm to about 500 nm, then the center wavelength emission can be within the range of 450 nm and 500 nm, and can be weighted toward the center in some instances, e.g., peak at about 465 nm, peak at about 475 nm, peak at about 485 nm, etc. In examples where a narrow bandpass filter is used as described herein, the narrow bandpass filter can have a center wavelength profile that corresponds with a center wavelength emission of a wavelength range of light present in the stream of light-signal pulses, e.g., narrow band pass filter in the aforementioned example can be suitable to receive the center wavelength emission, and exclude light that is outside its center wavelength profile. The optical bandwidth of the stream of light-signal pulses does not need to be the same bandwidth of light accepted by the narrow bandpass filter, but typically the peak center wavelength emission will fall within the range of light that the narrow bandpass filter allows through With this arrangement, the center wavelength profile of the filter can be said to correspond to the center wavelength emission of the stream of light-signal pulses.

Regardless of the light pulse frequency (or pulse modulation frequency), e.g., LED light pulse frequency, center-emission wavelength(s), and/or bandwidth used, capitalizing on these advantageous photonic properties, e.g., rapid switching, stable-emission wavelengths, and/or narrow-bandwidths, permits both the modulation and the subsequent demultiplexing of Lighting, e.g., LED lighting, using pulse frequency, wavelength differentials (by emitting two or more wavelengths of light), and/or intensity modulation. Furthermore, in some examples, the stream of modulated light-signal pulses generated can be combined with a fourth factor, which can include (homogeneous) circularly-polarization of the light-signal pulses, either with passive filtration for encoding and decoding of the polarized light, or by synchronous encoding (e.g., modulating/multiplexing) and decoding (e.g., demultiplexing/demodulating) of the polarized light by rapid oscillation of left- and right-circular polarization.

The use of circular polarization may provide advantages over other forms of polarization for a number of reasons, though other types of polarization are not excluded. For example, there is no significant source of circularly-polarized light in nature; and thus, utilizing circular polarization in an instrument system permits very sensitive imaging against an essentially zero background. Furthermore, circularly-polarized light suffers very little depolarization due to fog and other fine particulates that may be present in low visibility conditions. Thus, light penetration depth through turbid media is much greater with circular polarization than with linear polarization. In further detail, circular polarization permits encoding directional information in a light source, e.g., LED light source. Thus, by combining circular polarization with wavelength modulation and intensity modulation, for example, even more significant contrast enhancement can be achieved compared to using only one of these types of filtering/modulation.

In one example, the lighting contrast enhancing systems of the present disclosure can be carried out in bistatic configuration that typically includes two subsystems. The two "subsystems" are said to be bistatic because there is a light-transmitting subsystem that can be at a first location, and a second light-receiving subsystem at a second location. However, in certain examples, both subsystems can be included on a common carrier, like an aircraft (rotary- or fixed-wing), automobile, truck, train, surface water vessel, submersible vessel, etc. (including either remote- or onboard piloted carriers), where light-signal is sent and received using reflected light to and from a remote location. Thus, these examples where two subsystems are present at a common location can be referred to as "monostatic" systems, even though there is still a light-transmitting subsystem and a light-receiving subsystem. Regardless of the way in which the LED contrast enhancing system is referenced, the systems of the present disclosure include both subsystems, either remotely located with respect to one another or on a carrier vehicle that uses reflected light, such as from a retroreflector, e.g., a corner cube reflector, or even from the environment in general without a specific retro-reflective device in place.

These configurations, it should be noted, permit the enhancement of "contrast," rather than brightness, by enhancing light-source contrast from the light-transmitting subsystem (e.g., on the ground at an airfield or reflected from the ground) while minimizing contrast thresholds of detection at the light-receiving subsystem (e.g., in an aircraft). In one specific example, the system can utilize modulating/polarization filtering light at the airport and demultiplexing/filtering/demodulating light on the airplane. One purpose of the ground modulation/filtering can be to enhance the contrast between the Light source, e g. LED light source, and other, background illumination, while also minimizing general visual "clutter," which can be defined as competing but unrelated sources of ground light such as vehicle headlights, parking lot lights, commercial light displays, etc., thus providing contrast-enhanced images of the ground lighting at an airfield, while minimizing background light. For example, an LED light at its source, such as on the ground, and a reception point, such as on an aircraft, can benefit from both encoding LED light and decoding LED light, respectively, with one or multiple categories of information, namely radiance, polarization (e.g., circular polarization either using passively filtering at both subsystems, synchronously oscillating at both subsystems, or a combination of both passive filtering and synchronous oscillation at either respective subsystems), and wavelength (color), etc. These categories of information, for example, can be used together at the same time and can be even more effective because the benefits can be multiplicative. By using two categories of information or even three categories of information, increasingly significant improvements can be further realized, e.g., longer visibility distances achieved. For example, with a correctly configured synchronous system in place daytime low visibility conditions of one quarter mile, for example, can be increased to LED light visibilities of at least 20 miles, at least 10 miles, at least 5 miles, at least 4 miles, at least 3 miles, at least 2 miles, or at least 1 mile, depending on the equipment and synchronization profile in place. For example, when using three categories of light information together, longer distances may be possible than when using two categories or a single category. At least 10 miles, at least 5 miles, at least 4 miles, at least 3 miles, at least 2 miles, or at least 1 mile may even be achievable at night under low visibility conditions. Some results are even better as calculated and illustrated in Table 1 (which models one specific system by way of example) hereinafter.

With respect to encoding and/or filtering the LED light, coding (modulating) for light radiance levels, e.g. 100% compared to a fraction thereof, can be achieved by pulsing the power supplied to the Light source, e g. LED light source, at specific and defined modulation pulse frequency (or pulse modulation frequency) and timing, which can also include duty cycle synchronization. For example, if there are two LED lights, the duty cycle for each can be about 50% so that the two LED lights can alternate ON and OFF with essentially no temporal overlap, e.g. during one duty cycle, the period can be defined as: first LED light-ON and second LED light-OFF, followed by first LED light-OFF and second LED light-ON. As a definitional note, when describing duty cycles or cycles of synchronous optically detectable events, if a light is not specifically mentioned as being ON or OFF, it is understood that the light is OFF, allowing for some overlap such as for example due to trailing resonance or other minor overlap. Thus, during the single duty cycle mentioned briefly above, this same period can alternatively be described as: first LED light-ON followed by second LED light-ON, which conveys the same information in a more abbreviated format. Alternatively, these same four optically detectable events, or scene states, could be patterned or sequenced differently, such as first LED light-ON, first LED light-OFF, second LED light-ON, and second LED light-OFF. Other patterns could also be used, for example. In further detail, filtering the LED light for circular polarization can be accomplished by rejecting or filtering out unpolarized and linearly polarized light, but accepting right- or left-circularly-polarized light (or in some cases, accepting transmission for right- and left-circularly-polarized light). In one specific example, encoding (modulating) the LED light for wavelength and intensity can be achieved by using a light source, e.g. LED light source, including two or more LED emitters, or groups of emitters, of different center wavelengths (wavelength modulation), pulsed in a flashing pattern (intensity modulation), which can then be decoded at the light-receiving subsystem.

On the aircraft, for example, all three categories of modulated (intensity and wavelength) and polarized (circular polarization) information encoded in the light (or even other types of encoding) used to generate "the image" on the ground may be decoded by a processing unit that demodulates the light-signal that arrives (demultiplexed) in the form of a stream of digital images. For intensity demodulation (after demultiplexing), the light-receiving subsystem can subtract the image received when the light is pulsed "OFF" from that received when the light is pulsed "ON." OFF events during a cycle can occur in a few ways, such as by turning the LED light-OFF conventionally during a duty cycle. Alternatively, an OFF event can be generated optically without necessarily turning off the LED light per se. For example, a light-transmitting subsystem can include a synchronous homogenous circularly polarizing filter (more generally referred to as a synchronous optical multiplexer) that oscillates between right- and left-polarization, and the light-receiving subsystem could include a passive homogenous circularly polarizing filter that accepts only right-polarization (or only left-polarization). Thus, as the synchronous polarizer oscillates between right- and left-polarization, the LED light would appear ON at right-polarization events and OFF at left-polarization events. Alternatively, the synchronous polarizer could be located at the light-receiving subsystem and the passive polarizer could be at the light-transmitting subsystem with similar effect. Either way, a stream of modulated light-signal pulses can be generated optically using a light source, e.g. LED light source, that does not itself pulse per se. Or, in another example, a combination of LED light source pulsing and this type of optically generated pulsing may also be combinable to generate more complexity to the light-signal that is transmitted and received.

In still other polarization examples, passive homogenous circularly polarizing filters could be used at both subsystems to pass circularly-polarized light through to a light imager, while rejecting other polarizations of light not transmitted with the same circular polarization. For wavelength demultiplexing, the light-receiving subsystem can use an optical demultiplexer, such as for example, one of two narrow bandpass filters in a synchronously alternating pattern, to reject light of undesirable wavelengths, or other optical demultiplexers. The optical image received, which can be filtered and then captured by imaging sensors synchronized by an image acquisition controller, can be relayed to a demodulation image processor that can utilize software to produce a contrast-enhanced or optimized digital image stream from the varied images captured by the synchronous demultiplexing system. Upon demodulation and processing in the computer system, such as by least squares, maximum likelihood, etc., methods, a real time or near-real time, continuous stream of images can then be displayed for the pilot on a video display, or remotely on a video display to an operator on the ground, such as a drone pilot. The image that is displayed can be, for example, a contrast-enhanced video stream of the pilot's target runway spread out therebeneath, with its edge lights or even centerline lights (if so equipped) accentuated, which would be suitable for the pilot to proceed with a visual landing, even in otherwise Instrument Flight Rules (IFR) conditions. In one example, the continuous stream of contrast-enhanced images can be generated from at least two wavelengths of light, and incorporate a weighted sum of four to eight digital images. The weighted sum can incorporate coefficients that accomplish both intensity and wavelength demodulation, for example, where the coefficients are determined using the least squares or maximum likelihood estimation mentioned above.

The mathematics behind the LED contrast enhancing systems of the present disclosure can provide some understanding of how these systems can be effective, as the calculation that demonstrates the magnitude of visibility improvement that the systems described herein can be capable of achieving shows. The mathematics revolve around the FAA's established Runway Visual Range (RVR) Standard, but could be applicable to increasing visibility range in a variety of circumstances using a variety of mobile carriers. To provide useable performance parameters, in one example, the RVR can be modified, while retaining its functional form, allowing certain parameters to be appropriately modeled or described. Thus, in accordance with this, the performance of the enhanced contrast and imaging system described herein can provide detection and imaging capabilities superior to those of the human eye. The current RVR standard is based on photometry (e.g., the measurement of human eye response). In accordance with examples of the present disclosure, radiometry (e.g., the measurement of absolute light energy) can be a more relevant measure of contrast-enhanced images in low visibility conditions. Thus, the mathematics herein can likewise utilize radiometry, which is relevant to instrument measurements.

One factor in the performance of the LED contrast enhancing systems of the present disclosure can relate to the system's ability to capitalize on various factors, such as intensity modulation, wavelength modulation, oscillatory polarization modulation, circularly-polarized light filtration, narrow bandpass filtration, etc., which provide light properties that the unaided human eye may not be able to detect or distinguish. In other words, the threshold of detection, even in otherwise low visibility conditions, can be reduced far below that which the eye can normally see, e.g., the system can operate so that the LED light-signal(s) can be sensed in a manner that is much more sensitive than that of the human eye. This reduced threshold of detection may also allow the LED contrast enhancing system to take advantage of the fundamental color purity that can be present in LED light and that can sometimes be too bright for the human eye to comfortably or safely view. In further detail, the LED contrast enhancing systems can reject light-signals of lesser purity or mixed colors, with its use of wavelength matched filters, e.g., narrow bandpass filters. In further detail, the LED contrast enhancing systems described herein can greatly increase the gathering ability of the LED light-signal (s) through the use of a light receiver that can include a telescopic lens for collecting many more times, e.g., up to 50 times or more, incoming light compared to the human eye.

Even though there are many ways of modulating or filtering light to encode it for transmitting and then demultiplexing and/or filtering to decode light for enhancing the contrast of the light, for purposes of discussion, intensity modulation, wavelength, modulation, and circularly polarizing filtration are discussed together as it relates to the mathematics described herein. Notably, however, other forms of modulation can be implemented to further enhance the systems of the present disclosure, or other forms of modulation can be used alternatively. Rather than using two pulsed LED lights to provide intensity modulation and wavelength modulation and demultiplexing/demodulation based on four (or more) unique, optically detectable events (e.g., first LED light-ON, first LED light-OFF, second LED light-ON, second LED-light-OFF; in any pattern or timing), an alternative system could be modified to use only one pulsed LED light and a synchronous homogeneous circular polarizer that switches between right- and left-circular polarization synchronously with the pulses. This type of system can generate three (or more) optically detectable events, namely LED light-ON with right-circular polarization, LED light-ON with left-circular polarization, and LED light-OFF. If two pulsed LED lights were used with a synchronous homogeneous circular polarizer, five (or more) optically detectable events could be generated, namely first LED light-OFF and second LED light-OFF, first LED light-ON with right-circular polarization, first LED light-ON with left-circular polarization, second LED light-ON with right-circular polarization, and second LED light-ON with left-circular polarization. In still other examples, LED light radiance could be changed, such as LED light 100% radiance-ON, LED light with fractional radiance-ON (e.g., 40% to 60%), and LED light-OFF. These could likewise be coupled with any of a number of other types of modulation, multiplexing, and/or filtration (e.g., either passive filtration or using electrically actuated synchronous oscillating filtration).

A more specific list of various example combinations of optically detectable events per transmitting/receiving cycle can be generated (in any sequence and/or timing pattern including overlapping events and/or non-overlapping events), as follows (using LED lights as an example):

i) first LED light-ON and first LED light-OFF (two optically detectable events from one LED light);

ii) first LED light-ON with left-circular polarization, first LED light-ON with right-circular polarization, and first LED light-OFF (three optically detectable events from one LED light with synchronous homogeneous circular polarizer);

iii) first LED light-ON with first radiance (e.g., at or near 100%), first LED light-ON with second radiance (e.g., 40% to 60%), and first LED light-OFF (three optically detectable events from one LED light);

iv) first LED light-ON, first LED light-OFF, second LED light-ON, and second LED light-OFF (four optically detectable events from two LED lights);

v) first LED light-OFF and second LED light-OFF, first LED light-ON with right-circular polarization, first LED light-ON with left-circular polarization, second LED light-ON with right-circular polarization, and second LED light-ON with left-circular polarization (five optically detectable events from two LED lights with synchronous homogeneous circular polarizer); or vi) first LED light-OFF and second LED light-OFF; first LED light-ON with first radiance, first LED light-ON with second radiance, second LED light-ON with first radiance, and second LED light-ON with second radiance (five optically detectable events from two LED lights).

Thus, as can be seen in examples i) to vi) above, several examples are provided where from two to five unique optical events can be generated by combining various types of synchronous modulation of the light source, e.g., LED light source. Thus, it can be appreciated that by layering still another type of synchronous light modulation, even more unique light events can be generated, e.g., up to nine or more unique optical events during a single duty cycle or modulation/demodulation cycle. In accordance with this, in practical terms, from two to nine, three to nine, four to nine, etc., unique optical events can be generated and synchronized with a light imager to enhance lighting contrast from a light source, for example. Furthermore, it is noted that these optically detectable events do not need to occur in any particular order, and indeed, some optically detectable events can be generated and received at the same time. For example, in the simple example of the use of two LED lights, the LED light-ON optical event of a first LED light and the LED light-OFF optical event of a second LED light can occur simultaneously. For example, the two LED lights can be oscillated or pulsed in an alternating pattern with little or no temporal overlap, e.g., each emitting 50% or less during a single duty cycle (or at some other percentage ratio equaling up to 100%). In further detail, each LED light could emit from 30% to 60%, from 40% to 55%, or from 45% to 50% of a single duty cycle in an alternating pattern. Up to a 10% overlap (10% of duty cycle time where both LED lights are actively emitting, excluding trailing discharge time) can be considered "little to no temporal overlap," for example. These four optically detectable events, or scene states, could alternatively occur in sequence, e.g., first LED light-ON, first LED light-OFF, second LED light-ON, and second LED light-OFF. Other patterns could also be used. Thus, various optical events can occur in any order, sequence, etc., during a single modulation/demodulation cycle, with some events occurring in a patterned series and/or others occurring in parallel. In some instances, the use of multiple imaging sensors at the light imager can be helpful in achieving some flexibility in this regard. Furthermore, on top of any light modulation that may occur, simple filtration using polarizers at both the light-transmitting subsystem and the light-receiving subsystem, the use of narrow bandpass filters at the light-receiving subsystem, and/or other appropriate filters can be used to further enhance the optical performance of the systems of the present disclosure.

With this in mind, the systems described herein with respect to the mathematical models and calculations, for convenience, are exemplified using only pulsed light (intensity modulation), left- or right-homogeneous circularly-polarization (passive filtration), and two wavelengths of light with offset center-emission wavelengths (wavelength modulation), even though many other combinations of modulation and/or filtration can be used as described above. Thus, with respect to one specific mathematical model with these specific "enhancements," differences can be factored into the quantitative analysis of the performance of the systems described herein, which at a basic level, can be evaluated compared to how the unaided eye of a pilot sees the runway. In accordance with this, equations that are currently used in calculating the Runway Visual Range (as seen by a pilot without the aid of enhanced imagery) can be adapted and modified to take into account the specific equipment described in this example.

Essentially, the FAA Runway Visual Range (RVR) is a calculated estimate of how far down a runway a pilot should be able to see. It is calculated from the values of three measurements: (1) the atmospheric extinction coefficient; (2) the ambient light level (background luminance); and (3) the intensity of the runway lights. The RVR is an absolute standard, which is as follows: an RVR below 50 feet is considered zero visibility; and an RVR above 6,500 feet is considered unrestricted visibility. Two RVR values are calculated at airports routinely: the first for seeing objects during daylight hours and the second for seeing lights during nighttime hours.

The RVR value for seeing objects is based on both Koschmieder's Law and measurements from a ground-based visibility sensor that uses forward light scattering to estimate the atmospheric extinction coefficient. The FAA states that Koschmieder's Law for RVR should be zero whenever the ambient light level (background light level) is below $6.85 \times 10^{-6}$ candela/meter$^2$, which is the accepted value for nighttime background luminance. This condition could occur when there is heavy nighttime fog, smoke, snow, or other obscurant.

The RVR value for, seeing runway lights is based on Allard's Law; a measurement of the atmospheric extinction coefficient; the intensity of the runway lights (which is one of five standard intensity levels set by airport control tower personnel); and an estimate of the visual threshold (which is the minimum luminance required for a pilot to distinguish a small light source from the background luminance) Allard's Law gives the distance at which a pilot is expected to see lights of a specified intensity, such as runway lights that have known intensity.

Two threshold values from the FAA RVR standard that can be altered to accommodate the higher performance capabilities of the lighting contrast enhancing systems of the present disclosure include the contrast threshold value, $C_t$, from Koschmieder's Law, and the visual threshold value, $E_t$, from Allard's Law.

The contrast threshold value, $C_t$, can be lowered to 0.005, from 0.05. This is because the imagers onboard the aircraft are highly sensitive to incoming light. They are capable of achieving a quantum efficiency factor of 80%; and they also attain very low noise operation that is limited only by the extant photon-shot noise, which is determined by the pixel-electron well depth of the imagers. Thus, equation (1) is provided, as follows:

$$PSNR = \frac{1}{\sqrt{N_W}} = \frac{1}{\sqrt{40,000}} = 0.005 \qquad (1)$$

where:
PSNR=photon shot noise ratio
NW=pixel electron well depth in numbers of electrons The exponential parameter for the visual threshold, $E_t$, for dependence background luminance from Allard's Law is routinely taken as −5.7, whereas the lighting contrast enhancing system of the present example can be lowered to −6.7. This visual threshold is lowered because of three attributes of example components of the lighting, e.g., LED, contrast enhancing system of the present example. It should be noted that these calculations are based on specific equipment, and other equipment could likewise be used, substituted, added, subtracted, etc. The values used for these calculations are thus for exemplary purposes only. The three attributes that justify the modification of the dependence background luminance include the great light-gathering capacity of the telescopic lens included in the light receiver onboard the aircraft; the rejection of noncircularly-polarized light by the homogeneous circularly polarizing filter; and the wavelength selectivity of the synchronous wavelength demultiplexer. To illustrate, equation (2) is provided, as follows:

$$\log[E_t(B)] = -6.7 + 0.64 \cdot \log(B) \qquad (2)$$

Where:
$E_t$=visual threshold luminance
B=background luminance

Thus, equations (3a) and (3b) below can become a basic RVR standard in accordance with one specific example of the present disclosure, though other RVR standards could be used when other equipment and/or other configurations are used.

$$RVR_{CES}(R, \sigma, B, I) = R \qquad (3a)$$

Where R is that value which solves the (root) equation:

$$\left[ 10^{-6.7 + 0.64 \cdot \log(B)} - \frac{I \cdot e^{-\sigma \cdot R}}{R^2} \right] = 0 \qquad (3b)$$

Where:
$RVR_{CES}$=runway visual range using one specific LED Contrasting Enhancing System (CES) of the present example (in meters)

R=independent variable that is varied to make the argument of the root function, equation (3b) equal zero
σ=atmospheric extinction coefficient (in per meter)
B=background luminance (in candela per square meter)
I=runway light intensity (in candela)

These changes will neither weaken nor strengthen the current FAA RVR Standard. They can, in effect, create a new and separate, but equally stringent, optical instrument assisted, human vision category within the existing FAA Visual Flight Rules (VFR) category. Furthermore, it is noted that this new category could yield a completely consistent and reliable determination of runway light visibility conditions. The current FAA RVR Standard assumes a system's instruments respond in ways that are unvarying, repeatable, and precisely quantifiable.

The improvement in pilot visibility in low visibility atmospheric conditions that results from the proposed lighting contrast enhancing system of the present example can be significant. This improvement can be evaluated quantitatively, according to the assumed equipment described above, by calculating the ratio of the RVR of the new instrumental system to the FAA's traditional RVR, as shown in equation (4), as follows (using LED lighting as an example):

$$F_{impv} = \frac{RVR_{CES}(R,\sigma',I',B')}{RVR_{FAA}(R,\sigma,I,B)} \quad (4)$$

Where:
$F_{impv}$=Multiplicative factor by which the LED contrast enhancing system of the present example increases the RVR distance over that of a human
$RVR_{CES}$=runway visual range using the LED contrast enhancing system of the present example
R=independent variable that is varied to make the argument of the root function equal zero
σ'=effective atmospheric extinction coefficient for the LED contrast enhancing system of the present example
I'=effective runway light intensity imaged by the LED contrast enhancing system of the present example
B'=effective background luminance imaged by the LED contrast enhancing system of the present example
$RVR_{FAA}$=runway visual range using the FAA values for human vision
σ=atmospheric extinction coefficient
I=runway light intensity
B=background luminance The ratio of improvement under the LED contrast enhancing system of this example can be as much as a factor of 50 for nighttime conditions and a factor of 90 for daytime conditions. Note that these are multiplicative factors, not percentage improvements. In simple terms, these factors can equate to the following representative improvements in pilot visibility in fog, smog, smoke, etc., as outlined in Tables 1A and 1B, as follows:

TABLE 1A

| Measured daytime visibility | Visibility with the LED contrast enhancing system of the present example |
| --- | --- |
| 1/16 mile | 5.6 miles |
| 1/8 mile | 11.3 miles |
| 1/4 mile | 22.5 miles |
| 1/2 mile | 45.0 miles |

TABLE 1B

| Measured Nighttime visibility | Visibility with the LED contrast enhancing system of the present example |
| --- | --- |
| 1/16 mile | 3.1 miles |
| 1/8 mile | 6.3 miles |
| 1/4 mile | 12.5 miles |
| 1/2 mile | 25.0 miles |

In further detail regarding enhanced visibility performance, particularly in aviation, the Federal Aviation Administration of the United States Government has established performance requirements for the performance of an Enhanced Flight Vision System (EFVS). With acceptable EFVSs, a pilot may be able to perform an approach or landing, determine enhanced flight visibility, identify required visual references, or conduct rollouts with visibility less than that which would otherwise be required for visual flight. Operational credit beyond the minimum visibility requirements can be allowed with equipment that provides a visual advantage to the pilot, beyond that capable with the natural eye. As an example, if an EFVS provides enough visibility to be given 25% operational credit, then instead of a 1 mile minimum visibility requirement to conduct an operation, the visibility requirement for that pilot would be only ¾ mile, and thus, the pilot could operate in poorer visibility conditions. The FAA also sets forth operational credit for systems at 33% and at 50%. In accordance with this, a system that is effective may provide two times (2×) the visibility, and achieve an operational credit of 50%, for example. With some of the systems described herein that would be suitable for some types of EFVSs, modeling indicates that visibility improves a full order of magnitude or more better than 2× visibility can be achieved. For example, using wavelength modulation, a narrow bandpass filter, and circular polarization, modeling indicates greater than a 25× improvement in visibility may be achieved, and in advective fog, the performance could still be greater than 15× improvement. With a single wavelength of pulsed light (e.g., from a single LED light source), along with a narrow bandpass filter, and circular polarization, modeling indicates perhaps a greater than 20× visibility enhancement. With a single wavelength of pulsed light and a narrow bandpass filter, modeling indicates a 9× visibility enhancement. Additionally, with a single wavelength of pulsed light and circular polarization encoding and decoding, a 6× enhancement in visibility may be achievable according to modeling. Even if the visual enhancement were half or one quarter of these values in practice under certain conditions, they would still be significant enough to achieve operational credit, many systems far exceeding the 50% operational credit requirement.

Returning now to the FIGS., particularly FIGS. 2, 3, 5 and 6, each of which include a light-transmitting subsystem, these FIGS. can be further described in the context of the wiring at an airport. This specific example provides merely one system for "wiring," "communicating," and/or "powering" the equipment of the present disclosure at an airport, as either a new lighting installation or an adaptation of an existing installation. However, there are many other ways of implementing the systems (or light-emitting subsystems) of the present disclosure. More specifically, FIG. 3 shows a schematic diagram of a light modulating/filtering system that may be based, for instance, at an airport or other location where there are light fixture, e.g., LED light fixtures, and where improved visibility is desired. The system may include, for example, a first reference oscillator 26, such as a Global Positioning System (GPS)-disciplined oscillator to receive a reference signal from a remote or broadcasting source 22, which can be a GPS satellite in this example. A GPS-disciplined oscillator (GPSDO) is a combination of a GPS receiver and a high quality, stable oscillator, whose output is controlled to agree with the signals broadcast by GPS and GNSS satellites. This may be a rubidium, cesium, or quartz crystal, oven-controlled GPS-disciplined oscillator, for example. A GPS-disciplined oscillator, for example, may produce a continuous, high frequency, reference signal, with a frequency stability of better than two parts per billion per year, for example, though lower frequency stability would still provide functionality in some instances. Such a reference signal can be utilized to coordinate, or synchronize, a stream of modulated light-signal pulses produced by one or more lights at the airport lighting system on the ground, with demultiplexing and filtering detection and imaging of the emitted stream of light occurring onboard the aircraft, to be displayed to the pilot (or even a remote pilot on the ground).

Based on the output of the GPS-disciplined oscillator, or first reference oscillator 26, a synchronous modulation signal generator 32 may convert the relative high frequency reference signal produced by the oscillator, e.g., on the order of about 10 MHz, to a relative low frequency electrical signal, e.g., from 100 Hz to 130,000 Hz, or from 100 Hz to 48,000 Hz, or other ranges described elsewhere herein. The term "relative" is used to clarify that the two signals are not generically "high" or "low," but rather are high and low relative to one another. The relative low frequency electrical signal can be 100 Hz as a minimum because this frequency is above what is considered to be the visual flicker fusion rate, whereas in this example, 48,000 Hz can be used as a practical upper limit so that the signal can be relayed through the isolation transformer 40 (or multiple isolation transformers along the airfield series lighting loop 38). In one configuration, it may be cost effective to provide a single synchronous modulation signal generator 32 located, for example, in the electrical power vault at the airport. In some configurations, however, the synchronous modulation signal generator may be located at each individual light, e.g., LED, fixture where light is to be modulated (not shown).

The relative low frequency electrical signal produced by the synchronous modulation signal generator 32 can be communicated to a first power line carrier communications modem 34 and, ultimately, to a second power line carrier communications modem 42 via a constant current regulated (CCR) AC power supply 36 and the airfield series lighting loop 38. The first power line carrier communications modem can be utilized by the airport control tower to monitor and control the airport lighting system. It can also transmit communication from the synchronous modulation signal generator to the CCR AC power supply. In some instances, this first power line carrier communications modem can be replaced by a system that couples the synchronous modulation signal generator directly to the CCR AC power supply.

The constant current regulated (CCR) AC power supply 36 can provide electrical communication signals to the light fixture (or light source), e.g., LED light fixture or source, via the airfield series lighting loop 38. The CCR can also regulate the electrical current supplied to each fixture so that the individual lights 52 and 54 in the system emit at about the same intensity. If advantageous, the constant current regulated AC power supply may be eliminated or bypassed, and the synchronous modulation signal generator 32 can be connected directly, through a coupling circuit, to the airfield series lighting loop. Furthermore, both the CCR AC power supply and the first power line carrier communications modem 34 may be bypassed by connecting the synchronous modulation signal generator directly to the airfield series lighting loop via a coupling circuit.

In some configurations, the airfield series lighting loop 38 serves as the main cable that carries electrical power, as well as monitoring synchronous control information, to all of the individual light fixtures that are part of the overall airport lighting system, or at least the light system where the system of the present disclosure is being implemented (e.g., runway, taxiway, apron, tower lighting, etc.). Use of the airfield series lighting loop can prevent radio frequency interference with navigation and communication transmissions that may result from the use of wireless transmissions; however, wireless communication may be acceptable in locations such as improvised or low traffic landing strips, for instance, to distribute the synchronous modulation signal generator's output to the light fixtures. Fiber optic cables may also fulfill this or other distribution functions. The airfield series lighting loop can connect to multiple individual light fixtures via its isolation transformer, for example.

The isolation transformer 40 can separate the electrical power used to feed each individual light fixture from the total electrical load carried by the airfield series lighting loop 38. A secondary winding can also be present thereon to carry communication control signals to a second power line carrier communications modem 42, and may also supply AC electrical power to the electromagnetic interference filter 44. An electromagnetic interference filter 44 may receive the AC electrical power from the isolation transformer 40 and relay it to the DC power converter 46, e.g. LED DC power converter. The electromagnetic interference filter 44 may remove the modem carrier frequency signal from the AC electrical power.

The DC power converter 46 can then change the alternating current (AC) electrical power received from the electromagnetic interference filter 44 into direct current (DC) electricity suitable for powering and pulsing the lights 52 and 54, e.g., LED lights, of the light source 50. The DC power converter can then send the new DC power to the synchronous power controller 48. In an alternative example, the DC power converter can be replaced by an alternative source of electrical power, such as a solar photovoltaic cell, a thermoelectric power generator, a fuel cell, etc.

The second power line carrier communications modem 42 can be fed by the isolation transformer 40 and relay a synchronous modulation signal to the synchronous power controller 48. In some configurations, the second power line carrier communications modem can engage in a two-way exchange with the first power line carrier communications modem 34 to control light output and monitor the status of the light fixture's light source 50, e.g., LED light source. The second power line carrier communications modem, in some circumstances, can be eliminated and replaced by a coupling circuit that would extract, from the secondary winding of the isolation transformer, the signal sent from the synchronous modulation signal generator.

The synchronous power controller 48 can provide appropriately synchronized power pulses to both a first and a second light 52 and 54 that can be synchronously controlled by providing an emitting pattern that is coordinated, e.g. alternating with little to no temporal overlap, or otherwise patterned in its emission cycle. The first and second lights can be physically arranged in a color pair, or using any two ultraviolet, visible, or infrared wavelengths of light.

Any suitable solid state light 52 and 54, e.g., bulb or LED light-emitting semiconductor, SLED, laser, solid state emitter, etc., can be used at the light source 50. For specific applications to airports, it can be desirable to utilize bulbs or emitters in compliance with FAA requirements for color wavelengths and output luminance By way of example and not of limitation, these may include: red, emitting at 640 nm; yellow, emitting at 575-580 nm; green, emitting at 495-534 nm; blue, emitting at 460-475 nm; and white (combining red, green and blue at emission intensities in the proportions suitable to achieve a correlated color temperature of 1800 to 5000 degrees Kelvin). White light, e.g., white LED light, could also be produced using blue and yellow light sources with an appropriate intensity ratio to generate the correlated color temperature of 1800 to 5000 degrees Kelvin.

The output optic 56 associated with the light source 50, e.g. LED light, can be positioned to capture the synchronously modulated light from the first and second lights 52 and 54. The output optic can include, for example, a parabolic reflector and a prism, which are beam-forming/beam-directing optics. The parabolic reflector can, thus, partially collimate the synchronously generated beam of modulated light-emission pulses to concentrate the intensity beam. However, in one example, the parabolic reflector can be replaced by a total internal reflectance light extraction optic (not shown).

The first polarizing filter 58, e.g., homogeneous circularly polarizing filter in one example, receives light from the output optic and filters it to reject unpolarized or linearly-polarized light. The circularly polarizing filter can thus transmit right- or left-circularly-polarized light, which in this specific example, is also intensity and wavelength modulated for decoding or demultiplexing/demodulation by the light-receiving subsystem onboard the aircraft.

Returning to FIG. 4, again, this example is based on an airport subsystem, which by definition herein includes controlled airports, uncontrolled airports, airstrips, heliports, or aircraft carrier landing areas, for example. However, the concepts described herein can be applied to other mobile carriers, as previously mentioned. In FIG. 4, this example provides a schematic diagram of a light-receiving subsystem, which can be a light-filtering/demultiplexing and demodulating and image processing system that may be located, for example, on an aircraft or other mobile carrier that would benefit from improved visibility of its destination. The light-receiving subsystem 70 can generally include a second reference oscillator 76, such as a GPS-disciplined oscillator (similar to that described in the context of FIG. 3). A synchronous image acquisition controller 82 can be included that converts a reference signal from a synchronous relative high frequency to a synchronous relative low frequency in the form of one or more signal(s) suitable for synchronous optical demultiplexing and/or image acquisition. The light-receiving subsystem in this specific example can also include a second (passive) polarizing filter 72, such as a homogeneous circularly polarizing filter; a light receiver assembly 74, which can include a telephoto lens for capturing light and focusing the light on a light imager or an intermediate synchronous optical demultiplexer or through a filter. For example, a synchronous optical demultiplexer, such as synchronous wavelength demultiplexer 86, can be controlled by one of the relative low frequency signals generated by the synchronous image acquisition controller 82. A light imager 100, which can include a first imaging sensor 102 and a second imaging sensor 104, can also synchronously receive the stream of modulated light-signal pulses and convert the optical information to a stream of demultiplexed digital images, or electrical signals. The light imager, thus, can also be controlled by a relative low frequency signal generated by the image acquisition controller. Thus, the relative low frequency signal sent to the optical demultiplexer (e.g., wavelength demultiplexer) and the relative low frequency signal sent to the light imager (e.g., including imaging sensors) can be the same relative low frequency signal, or can be two or more distinct relative low frequency signals, provided the various signals appropriately establish synchronization with respect to the light gathering operation of the optical demultiplexer(s) and the light imager. The stream of demultiplexed digital images can then be demodulated and image processed using a demodulation image processor 150 that can then be sent to a display where real time or near-real time video is displayed to an output display 152, which can be a video screen provided directly to the pilot as an enhanced vision system, or through other avionics that may add other information, such symbology or other images fused therewith, e.g., infrared enhanced view of the ground, etc., whether the pilot is onboard or piloting remotely, e.g., drone pilot.

As previously described, the GPS-disciplined oscillator (which is the second reference oscillator 76) can produce a continuous relative high frequency reference signal that is used to coordinate, or synchronize, the pulsed light, e.g., LED light, produced by the ground-based airport lighting subsystem with the detection and imaging of that light onboard the aircraft. It can relay this signal to a synchronous image acquisition controller 82 to be down converted to synchronous relative low frequency signals(s) for synchronous control of the timing and light-receiving frequency (e.g., frame rate) of the light imager (also referred to as a light imaging system) 100 and/or the synchronous optical demultiplexer 84. A rubidium, cesium, or oven controlled, quartz crystal GPS-disciplined oscillator, or other similar oscillator, can be utilized, for example.

The synchronous image acquisition controller 82 can convert the relative high frequency reference signal produced by the GPS-disciplined oscillator to a relative low frequency electrical signal (or lower frequency signal) to control both the light-receiving timing and frequency of the light imager 100, e.g., including a first imaging sensor 102 and a second imaging sensor 104, and a synchronous wavelength demultiplexer 86. A second polarizing filter 72, which in this example can be a homogeneous circularly polarizing filter which is the outermost optical element in the light-receiving subsystem, can reject unpolarized or linearly-polarized light and pass either right- or left-circularly-polarized light to the light receiver assembly, or both right and left-circularly-polarized light if the polarizer filter is a compound homogeneous circularly polarizing filter.

The light receiver assembly 74 can include, for example, a telescopic lens with an auto-focus feature, an auto-exposure feature, a focal distance of at least 350 mm, and/or an aperture of 50 mm or larger. A light receiver assembly of this type can have greater light gathering capacity than the human eye.

In one configuration, the synchronous wavelength demultiplexer 86 can receive image input (or the stream of modulated light-signal pulses) from the light-receiving assembly 74, and can then gate or time the pulses using one of the relative low frequency signals received from the synchronous image acquisition controller 82. The synchronous wavelength demultiplexer can include a digital micromirror device, for example, that directs the focused stream of modulated light-signal pulses (emitted from the ground pulsed light source, e.g., LED light source, and focused from the light receiver assembly) along one of two, alternating optical paths, each of which can be filtered by a narrow bandpass filter whose center wavelength corresponds to the center-emission wavelength emitted by the first or second alternating light sources of the airport-based system. This arrangement is shown in greater detail in FIG. 8. Returning to FIG. 4, however, the first imaging sensor 102 and the second imaging sensor 104 of the light imager 100 may be timed by the synchronous image acquisition controller and may detect narrow bandpass filtered images from the synchronous wavelength demultiplexer.

Though this arrangement is specifically disclosed and shown in FIG. 4, other arrangements can likewise be used that do not utilize a synchronous optical demultiplexing, for example, such as the use of two light receivers individually associated with two light imagers, where each light imager is optically associated with a narrow bandpass filter that has a similar centerline wavelength as the respective light wavelength (e.g., each rejecting the other wavelength, wavelength range of light, or the center-emission wavelength of light). Still further, a single light-receiving assembly can be used that generates a large enough light pattern to focus light on two adjacent imaging sensors, where each imaging sensor is optically associated with two different narrow bandpass filters that are closely matched to the respective light wavelengths emitted from the light source, e.g., LED light source, where each rejects the other wavelength or wavelength range of light, or the center-emission wavelength of light, etc.). Still further, rather than a synchronous wavelength demultiplexer used to modulate the focused light, a synchronous homogeneous circularly polarizing filter could be used to decode similarly encoded light also with coordinated oscillating polarity emitted from the ground, etc. Beam splitting prisms, such as a dichroic prism or a trichroic prism, could likewise be used for color separation and to direct two (or three) different wavelengths of light toward two or three different imaging sensors.

The first imaging sensor 102 and the second imaging sensor 104 of the light imager 100 can likewise be timed by the synchronous image acquisition controller 82. In this arrangement, the first imaging sensor and the second imaging sensor of the light imager can each produce two digital images of the ground lighting per each full demodulation cycle (which cycle can include demultiplexing, computer demodulation, and image processing), e.g., one with ground-based lights "ON" and one with lights "OFF." Together, the imagers may produce four, digital images per each cycle. The synchronous wavelength demultiplexer can be used to separate or demultiplex the two different wavelengths of light, or some other optical separation approach as described elsewhere herein can alternatively be used. With respect to the imaging sensors, in some circumstances, these two imaging sensors can be replaced by a single imager. For example, the output from the onboard synchronous optical demultiplexer 84 (or optical wavelength demultiplexer) can be reconfigured to produce a single, optical output path.

The demodulation image processor 150 can include, for example, a high speed computer, a high resolution display screen, and the software used to control their function. It may create a continuous series of contrast-enhanced or optimized digital images by utilizing an appropriate numerical method, such as "least squares" estimation or optimization, or "maximum likelihood" estimation or optimization, for demodulation of the demultiplexed images captured by the light imager. Other demodulation approaches can also be used. Utilizing least squares optimization, the contrast-enhanced image created by the image processing and display system can be expressed mathematically as a vector product involving a row vector of weights and a column vector of images. The image processing software can encompass such functions as pixel averaging to increase the signal-to-noise ratio of the images; estimating the locations of lights not yet imaged; registering the stream of images one to another to remove smearing of the light source images due to the motion of the aircraft; further increasing light-to-background contrast by known digital image processing techniques; etc. In one example, the continuous stream of contrast-enhanced images can be generated from at least two wavelengths of light, and incorporate a weighted sum of four to eight digital images. The weighted sum can incorporate coefficients that accomplish both intensity and wavelength demodulation, for example, where the coefficients are determined using the least squares or maximum likelihood estimation mentioned above.

The contrast-enhanced images produced by the demodulation image processor 150 may then be relayed as a streaming video image as an output display 152 to the pilot in the cockpit or to a remote pilot on the ground in real time as a continuous stream of images of the airport lights beneath the plane. The image stream can be displayed on a heads-up display (windscreen), an in-panel or other standard display, or a near-eye display, such as a head-mountable display.

In another example, the light imager 100 shown in FIGS. 1, 2, 4, 5, and 8 can be further modified to enhance the contrast of pulsed light emitted from a pulsed light source 50. This modification of the light imager is shown by way of example in FIG. 9 as a polarimetric light imaging assembly 300, which can be a synchronous polarimetric light imaging assembly. The polarimetric light imaging assembly can include, for example, a multi-wavelength retarder 160, a pixelated filter 170, and an imaging sensor 180. In one example, a light imager equipped with polarimetric optics can be used to detect the Stokes vector for the individual picture elements that may be received at the light imager. Stokes parameters are a set of values that characterize polarization of light, in terms of intensity (I), degree of polarization (p), and shape parameters of the polarization, e.g., the shape of the ellipse. These parameters can be used to characterize the Stokes vector for the input of light and/or the output of light. Thus, in one specific example, the polarimetric filter can be used with circularly polarized light emitted from the pulsed light source 50 to provide a complete Stokes vector for light pulsed from the pulsed light source 50, which is not part of the polarimetric light imaging assembly, but can be synchronously used with the polarimetric light imaging assembly.

In further detail, the multi-wavelength retarder 160, or waveplate, can be electrically- and synchronously-controlled to shift the relative phase relationship of the two orthogonal components into which linearly polarized light can be resolved. With the optical axis of the quarter wave plate at 45° relative to the optical axis of the linearly polarized light, a quarter-wave plate shifts the phase of one of the orthogonal components by 90° (i.e., ¼ wave) relative to the other and produces circularly polarized light from plane polarized light. If the optical axes of the quarter waveplate and the linearly polarized light were other than 45°, the resulting light would be elliptically polarized. There are many different types of retarders, including half-wave-plates which can shift the polarization direction of linearly polarized light, and shift right circular polarized light to left circular light and vice versa; and quarter-waveplates which can convert circularly polarized light to linear polarized light, and vice versa. Furthermore, a quarter-waveplate can be used to produce elliptical polarization. Other types of multi-wavelength retarders can be used for example the Fresnel rhomb which is a multi-wavelength or broadband retarder. The oscillation between phase-shift values, for example, can be electrically- and synchronously-controlled for a quarter, half, or other degree of phase shifting. Considering the conversion of circular polarization (or elliptical polarization) to linear polarization, a quarter wave retarder that is electrically- and synchronously-controlled can be used. In this example, as the pulsed light energy is received at the multi-wavelength retarder, a first wavelength state can exist where the phase shift is null (0), e.g., no phase shift, and a second wavelength state can result from a quarter wave phase shift, either (+¼) or (−¼) of a wave. In another example, a first wavelength state can result from a positive quarter wave shift (+¼), and the other wave state can result from a negative quarter wave shift (−¼). In Still Another Example, Three Different Wavelengths can Occur, Namely, a wavelength state where the wave shift is null (0), e.g., no wavelength shift, a second wave state resulting from a positive quarter wave shift (+¼), and a third wave state resulting from a negative quarter wavelength shift (−¼).

Figure 9:
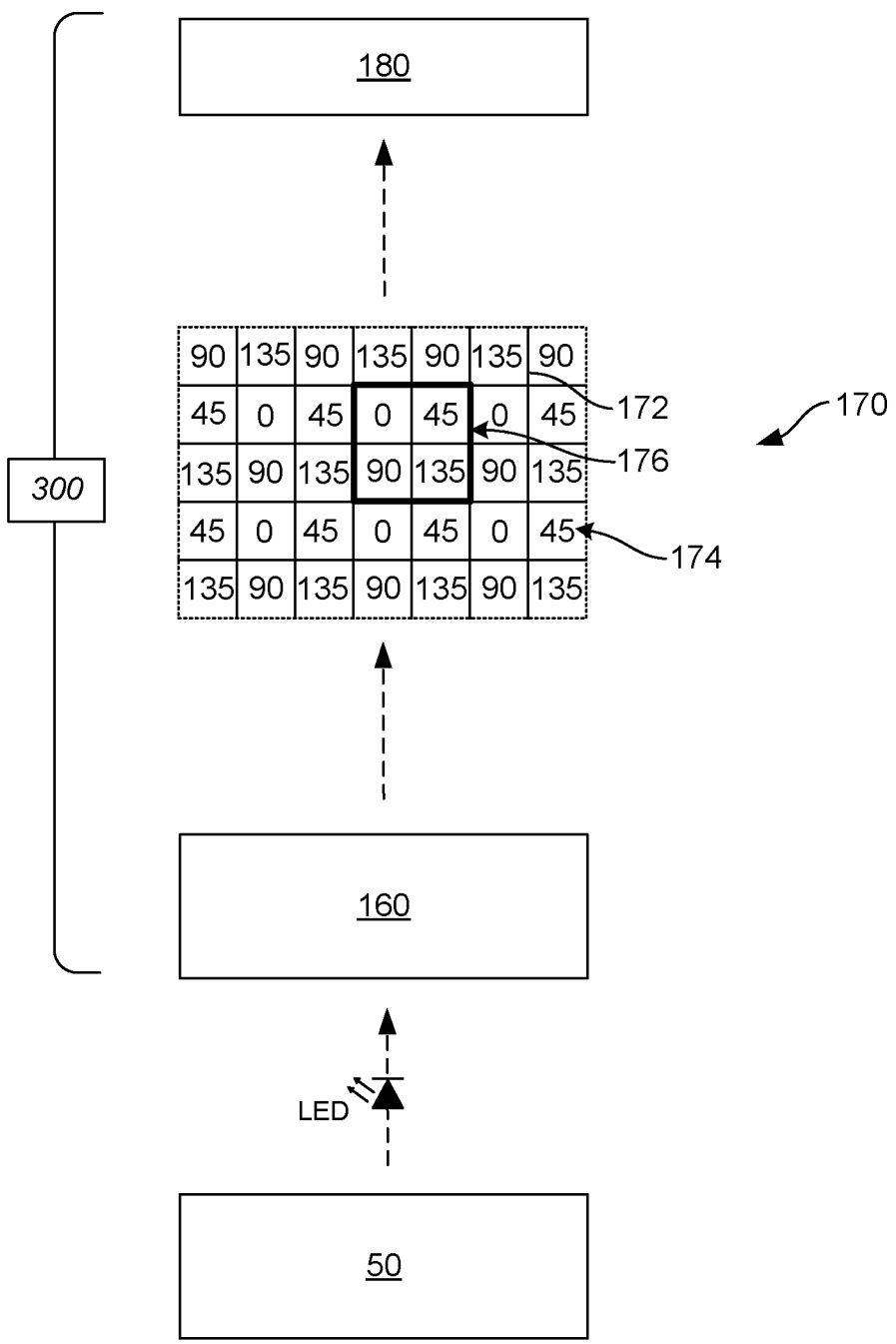
FIG. 9 is a component diagram of an example system for enhancing contrast of pulsed light in accordance with the present disclosure.

Synchronization between the pulsed light source 50 and the multi-wavelength retarder can be by any of the methodologies shown or by using any of the equipment described previously herein (e.g., a reference oscillator 76 and/or synchronous image acquisition controller 82 shown, and other synchronous equipment shown in each of the previous FIGS.). However, the polarimetric light imaging assembly 300 and the pulsed (LED) light source can be synchronized for other applications than those described herein (where a light-receiving subsystem is remotely located from the pulsed light source). For example, this technology, as shown in FIG. 9, could be useful for applications such as chemical detection of fluids or fluid components (gas or liquid), environmental safety equipment to detect dangerous gases in the atmosphere or room, sample analysis using light reflection or light scattering, security camera image enhancement using light or other pulsed electromagnetic energy outside of the visible spectrum, or other applications where image contrast enhancement may be beneficial. In such applications, LED or other light pulses can be synchronized more directly using appropriate synchronous circuitry and direct wiring, for example, or other wired or wireless technology. In these applications, the separation of LED or other light sources and the polarimetric light imaging assembly could be very close (within 1 inch, within 2 inches, within 6 inches, within 12 inches, within 3 feet, etc.), or at an intermediate distance (from 3 feet to 100 feet, from 3 feet to 1000 feet, etc.). With these relatively close proximities, wired or shorter distance wireless communication and synchronization may be practical, though the reference oscillator applications previously described could likewise be used, even at closer proximities.

With respect to the pixelated filter 170, in one example, the filter can be a wire grid, pixelated polarizer positioned atop the imaging sensor 180, e.g., focal-plane array such as a CMOS sensor, a CCD sensor, hybrid CCD/CMOS sensor, etc. A schematic view of a small portion of a wire-grid, pixelated polarizer is shown, and can include grid wires 172 which define pixel apertures 174, and four grouped pixel apertures collectively make up a single super-pixel aperture set 176. The pixel apertures, for example, can be aligned with imaging pixels present at the imaging sensor. Thus, each pixel aperture of the super-pixel aperture set can be configured to allow light to pass therethrough with different axes of polarization, e.g., 0 degrees, 45 degrees, 90 degrees and 135 degrees, as shown, and the imaging pixels within an imaging super-pixel may each provide a different axis of polarization from a common light-signal pulse emitted by the pulsed light source 50. This provides additional light imaging contrast, as even more information is received by the light imager than simply right or left circular polarization (or other polarization or unpolarized light information). In this arrangement, a super-pixel aperture set can provide for essentially the complete Stokes vector of polarization when used with circularly polarized light and a quarter-wave multi-wavelength retarder, for example.

Figure 10:
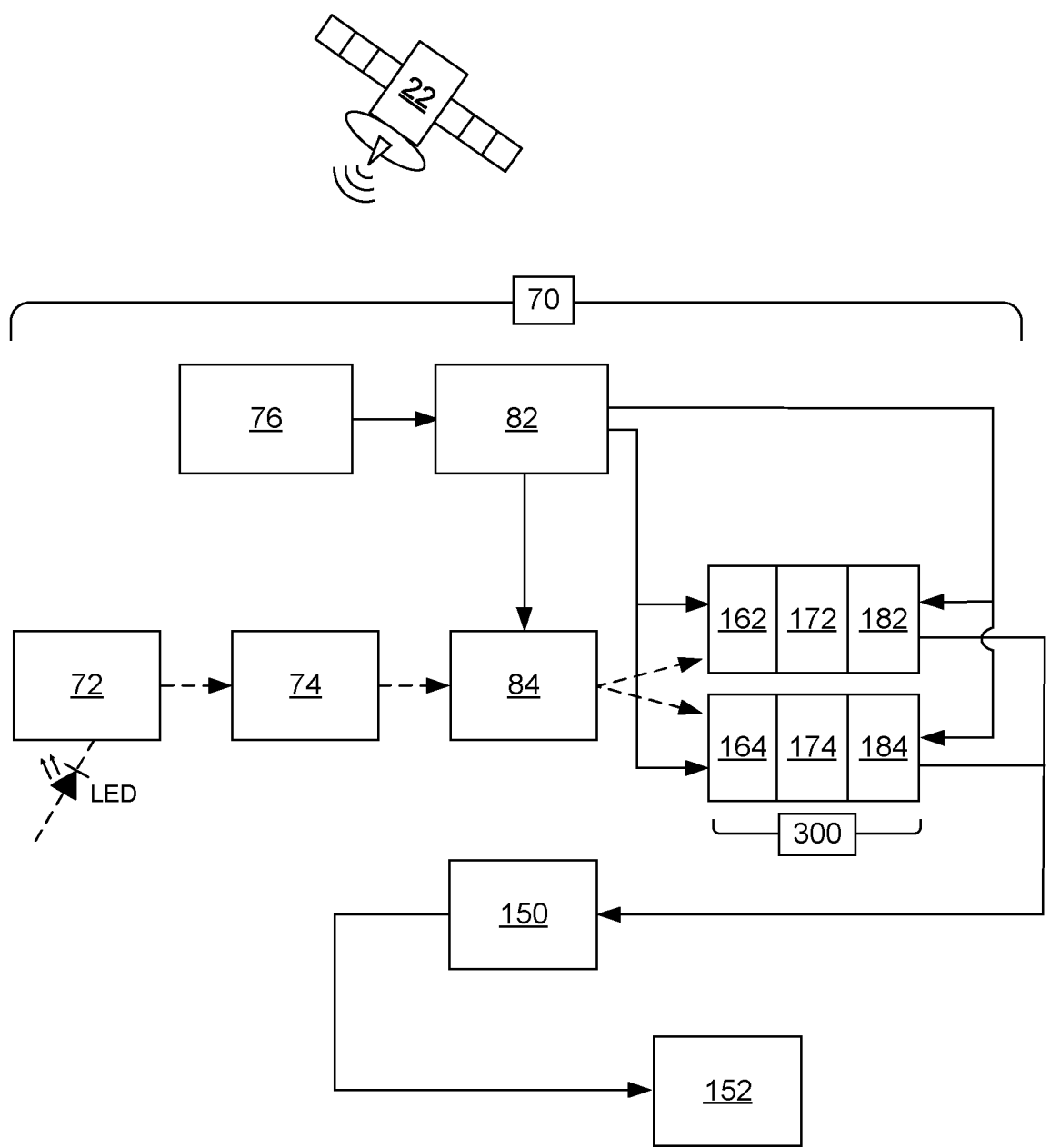
FIG. 10 is a component diagram of a more specific example of an aircraft-based light-receiving subsystem of a bistatic airport and aircraft lighting system with polarimetric imaging sensors in accordance with the present disclosure.

Turning now to the one particular use of the (synchronous) polarimetric light imaging assembly 300 in combination with synchronous pulses of light energy, FIG. 10 provides an alternative example of a light-receiving subsystem 70 that can be aircraft-based or based in another type of mobile carrier. In this example, the polarimetric light imaging assembly includes a pair of multi-wavelength retarders 162 and 164, a pair of pixelated filters 172 and 174, and a pair of imaging sensors 182 and 184. Notably, though there are two multi-wavelength retarders and two pixelated filters shown, these could be single unitary units that are large enough to be used over the pair of imaging sensors, for example. Thus, the term "pair" should be understood to be functional rather than literal in that these devices function to provide the processed optical image to the pair of imaging sensors in this specific example. That stated, in some specific examples, the polarimetric light imaging assembly may include only a (single) first imaging sensor 182, or it can include two or more imaging sensors, e.g., a first imaging sensor 182 and a second imaging sensor 184.

In further detail, the synchronous polarimetric light imaging assembly 300 (which is a more specific type of light imager, shown at 100 in FIGS. 1, 2, 4, 5, and 8, and which can be used in any of these aforementioned examples) and a light receiver assembly 74 can be used to optically receive and focus a stream of modulated light-signal pulses from a light source directly or indirectly onto the multi-wavelength retarder(s) 162 and 164 for synchronous optical processing in accordance with that described with reference to FIG. 9. In this example, there can be a second polarizing filter, which can be any type of polarizer, but in one example, can be a (homogenous) circularly polarizing filter (right, left, both right and left, or synchronously oscillatory between right and left polarization). The light receiver assembly may include, for example, a telescoping lens with a focal distance of at least 350 mm and/or an aperture of 50 mm or larger. Other assembly configurations may also be used by adjusting sensor sizes or by other techniques to provide the appropriate sensitivity and/or magnification.

The stream of modulated light-signal pulses can include a first wavelength range of light and a second wavelength range of light. As a note, the imaging sensors 182 and 184 and/or the multi-wavelength retarder can be independently powered and/or controlled by the synchronous image acquisition controller 82, or can be commonly powered and/or controlled using common circuitry. In either case, both imaging sensors can be part of a polarimetric light imaging assembly, and thus, the term "polarimetric light imaging assembly" should not be read to necessarily infer a common device per se, but rather a system that includes various circuitry and one or more imaging sensor(s), for example. For example, two imaging sensors can be included in a common device, or can be in two spatially separated devices that work collectively together. In both instances, the imaging sensors would still be considered to be part of the polarimetric light imaging assembly.

The light-receiving subsystem 70 can also include a second reference oscillator 76, which in this case can be a GPS-disciplined oscillator to receive a reference signal broadcast from a remote or broadcasting source 22, which can be a GPS satellite in this example. A synchronous image acquisition controller 82 can be present to convert the reference signal from a synchronous relative high frequency signal to synchronous relative low frequency signal(s). Additionally, the synchronous image acquisition controller can be used to convert the stream of modulated light-signal pulses synchronously received through the multi-wavelength retarders 162 and 164 and the pixelated filters 172 and 174 by the imaging sensors 182 and 184 (using one or more of the relative low frequency electrical signal(s) to provide synchronization) to a stream of synchronous digital images generated from the first wavelength range of light and the second wavelength range of light (synchronously captured by the first imaging sensor 102 and the second imaging sensor 104, respectively). Notably, the multi-wavelength retarders can also be oscillated electrically to pass multiple types of optical signals, typically providing a first optical picture during a first light-signal pulse event and then switching to a different configuration to provide a second optical picture for a second light-signal pulse event, and so forth. With dual-wavelength retarders, there may be three optical pictures that can be generated, e.g., +¼ wavelength shift, −¼ wavelength shift, and a (0) null wavelength shift. In some examples, two optical pictures (+¼ and −¼) is often enough to enhance contrast of the pulsed light energy, particular with circularly polarized pulsed light energy.

As mentioned, the image acquisition controller (as described for use with the imaging sensors 182 and 184) can also be used to synchronize the multi-wavelength retarder to provide one optical picture for a first light-signal pulse and a second optical picture for a second light-signal pulse, and so forth, e.g., in accordance with and in agreement with the relative low frequency electrical signal also generated by the synchronous image acquisition controller 82. Furthermore, the subsystem 70 can also include a processor 150 to demodulate and image process a stream of digital images received by the light imager and further process the image to generate enhanced contrast display imagery as previously described. The system can still further include an output display 152, which may typically be on the mobile carrier, but in one example, can be transmitted to a remote location such as to a remote drone pilot location, for example.

With more specific detail related to the polarimetric light imaging assembly 300 shown in FIG. 10 with two imaging sensors 182 and 184, because of the multi-wavelength retarders 162 and 164 and the pixelated filters 172 and 174, the light-signal pulses that are already contrast-enhanced by imager synchronization, circular polarization, and any of the other techniques described elsewhere herein, can be contrast-enhanced still further over and above that provided by polarization filtration, narrow-band wavelength filtration, synchronous oscillatory filtration, synchronous light-signal pulsing synchronous image acquisition, etc.

It is noted that, as used in this specification and the appended claims, singular forms such as "a," "an," and "the" may include the plural referents unless the context clearly dictates otherwise. Thus, for example, reference to "an LED light" can include one or more of such LED lights, and reference to "the narrow bandpass filter" can include reference to one or more of such filters.

As used herein, "encoding" can refer to either "modulating" and/or "multiplexing" light-signal pulses at a light-transmitting subsystem. The term "decoding" can refer to either "demultiplexing" or "demodulating" light-signal pulses at a light-receiving subsystem. Examples of modulation can include wavelength modulation (using two or more wavelengths of light), intensity modulation (using pulsed light), radiance modulation (using different levels of light radiance), etc. An example of optical multiplexing can include the use of oscillating polarization to optically apply cycling right- and left-polarization to a light-signal, etc. Both can be forms of encoding a light-signal. Regarding decoding, examples of optical demultiplexing can include wavelength demultiplexing, polarization demultiplexing, etc. Decoding using computer processors, software, etc., can also include demodulation, where captured imagery by a light imager can be demodulated and processed as described herein. That being understood, the use of a "passive" filter generally can also be used to code and decode light-signals, e.g., polarization to transmit and accept light of a certain polarization and reject other forms of light, narrow bandpass filters to accept narrow bandwidths of light and reject light outside of those bandwidths, etc. Often modulation/multiplexing/demultiplexing/demodulation can be used in conjunction with simple or passive filtration to generate even more significant improvements, etc. For example, modulated light can be generated using a pulsed light source and can be further encoded with passive circular polarization, and the modulated light can be optically decoded with respect to the circular polarization and also demodulated by a light receiver or components associated therewith at the light-receiving end of the systems described herein.

It should be understood that, while the modulation, demodulation, multiplexing, demultiplexing, filtering, processing, and/or displaying, etc., processes described herein have been presented herein in accordance with systems, subsystems, processes, flow diagrams, and the like, it is conceivable that the order of many processes or arrangement of various component devices or systems may be changed, and that the systems and methods may still function for modulating, demodulating, multiplexing, demultiplexing, filtering, processing, displaying, etc., for synchronous encoding and decoding of light. For example, a narrow bandpass filter is shown in FIG. 8 as being used in one particular manner. However, this filter can be used at any location along a light-signal path, including at the LED or other pulsed light source, before or after the light receiver assembly, etc., instead of a wavelength demodulator.

What is claimed is:

1. A system of enhancing contrast of lighting, comprising:
a light-transmitting subsystem, including a light source to emit a stream of light-signal pulses and an encoding circularly polarizing filter to optically encode the stream of light-signal pulses with circular polarization; and
a light-receiving subsystem, including a decoding circularly polarizing filter to optically decode the circular polarization of the stream of light-signal pulses and a pixelated light imager to receive the stream of light-signal pulses after being optically decoded by the decoding circularly polarizing filter, wherein the pixelated light imager is part of a polarimetric light imaging assembly that includes a multi-wavelength retarder with multiple light-receiving configurations.

2. The system of enhancing contrast of lighting of claim 1, wherein the encoding circularly polarizing filter is a homogeneous circularly polarizing filter oriented to encode emission of the stream of light-signal pulses of corresponding left- or right-circular polarization, and the decoding circularly polarizing filter is a homogeneous circularly polarizing filter which is correspondingly oriented to receive encoded left- or right-circular polarization to decode the emission of the stream of light-signal pulses.

3. The system of enhancing contrast of lighting of claim 1, wherein the light-receiving subsystem further comprises a narrow bandpass filter that corresponds with a center wavelength emission of a wavelength range of light present in the stream of light-signal pulses.

4. The system of enhancing contrast of lighting of claim 1, wherein, in operation, the stream of light-signal pulses emitted by the light source are synchronously correlated with a light-receiving frequency of the pixelated light imager.

5. The system of enhancing contrast of lighting of claim 4, further comprising a reference signal source that generates a reference signal to synchronize the light source and the pixelated light imager.

6. The system of enhancing contrast of lighting of claim 5, wherein:
the reference signal source locally controls the stream light-signal pulses emitted by the light source via wired or wireless communication and remotely controls the light-receiving frequency of the pixelated light imager via wireless communication;
a light source controller is included to control the stream of light-signal pulses emittable from the light source, wherein the reference signal source receives a pulse frequency corresponding to the stream of light-signal pulses by wired or wireless communication, and wherein the reference signal source wirelessly communicates the pulse frequency from an electromagnetic transmitter to the light-receiving subsystem;
the light-receiving subsystem further comprises the reference signal source, wherein the reference signal source locally controls the light-receiving frequency of the pixelated light imager or receives the light-receiving frequency from the pixelated light imager, and further wirelessly communicates the light-receiving frequency from an electromagnetic transmitter to remotely control the stream of light-signal pulses emitted by the light source;
the reference signal source is located remotely with respect to both the light-transmitting subsystem and the light-receiving subsystem, and wherein the reference signal source controls both the stream of light-signal pulses emitted by the light source and the light-receiving frequency of the pixelated light imager;
the reference signal source controls the stream of light-signal pulses emitted by the light source using a first reference signal oscillator located at the light-transmitting subsystem, and the reference signal source controls the light-receiving frequency of the pixelated light imager using a second reference signal oscillator located at the light-transmitting subsystem;
the reference signal is in the form of modulated electromagnetic radiation with a wavelength that ranges from that of the low radio frequency to that of the vacuum ultraviolet; or
the reference signal is in the form of modulated ultraviolet, visible light, infrared, microwave, radar, radio frequency, or a combination thereof.

7. The system of enhancing contrast of lighting of claim 1, wherein the light source comprises a first light to emit a first wavelength range of light and a second light to emit a second wavelength range of light.

8. The system of enhancing contrast of lighting of claim 1, wherein the stream of light-signal pulses are in the form of light in the ultraviolet spectrum, light in the visible spectrum, light in the infrared spectrum, or a combination thereof.

9. The system of enhancing contrast of lighting of claim 1, wherein the light source is a solid state LED light source or an SLED light source.

10. A system of enhancing contrast of lighting, comprising:
a light-transmitting subsystem, including a light source to emit a stream of light-signal pulses and an encoding circularly polarizing filter to optically encode the stream of light-signal pulses with circular polarization, wherein the light source comprises a first light to emit a first wavelength range of light and a second light to emit a second wavelength range of light; and
a light-receiving subsystem, including a decoding circularly polarizing filter to optically decode the circular polarization of the stream of light-signal pulses and a pixelated light imager to receive the stream of light-signal pulses after being optically decoded by the decoding circularly polarizing filter,
wherein:
the second light operates as a reference signal source for synchronization of the first light with the pixelated light imager for enhancing contrast of the first light;
the first light and the second light operate in combination with a reference signal source for synchronization of the first light and the second light with the pixelated light imager for enhancing contrast of the first light and the second light;
the first wavelength range of light is different than the second wavelength range of light by at least one-half of a first bandwidth of the first wavelength range of light or by at least one-half of a second bandwidth of the second wavelength range of light;
the pixelated light imager is optically associated with a first narrow bandpass filter having a center wavelength profile corresponding with a center wavelength emission of the first wavelength range of light; or
the pixelated light imager is optically associated with a first narrow bandpass filter having a center wavelength profile corresponding with a center wavelength emission of the first wavelength range of light and the pixelated light imager is optically associated with a second narrow bandpass filter having a center wavelength profile corresponding with a center wavelength emission of the second wavelength range of light.

11. A method of enhancing contrast of lighting relative to background light, comprising:
using a system of enhancing contrast of lighting, the system comprising: a light-transmitting subsystem including a light source to emit a stream of light-signal pulses and an encoding circularly polarizing filter to optically encode the stream of light-signal pulses with circular polarization; and a light-receiving subsystem including a decoding circularly polarizing filter to optically decode the circular polarization of the stream of light-signal pulses and a pixelated light imager to receive the stream of light-signal pulses after being optically decoded by the decoding circularly polarizing filter;
emitting the stream of light-signal pulses from the light source of the light-transmitting sub system;

optically encoding the stream of light-signal pulses with circular polarization at the light source;

optically decoding the circular polarization of the stream of light-signal pulses at the light-receiving subsystem;

receiving the stream of light-signal pulses at the pixelated light imager of the light-receiving subsystem after optical decoding; and synchronously correlating a light-receiving frequency of the pixelated light imager with a pulse frequency of the stream of light-signal pulses.

12. The method of claim 11, wherein the stream of light-signal pulses include a center wavelength emission of a first wavelength range, and wherein the light-receiving subsystem includes a narrow bandpass filter having a center wavelength profile that corresponds with at least the center wavelength emission of the first wavelength range of light, and excludes background light that is outside of a bandwidth range of light allowed by the narrow bandpass filter.

13. The method of claim 11, wherein synchronously correlating includes:

synchronously receiving, using a polarimetric light imaging assembly at the light-receiving subsystem, the stream of modulated light-signal pulses;

emitting the stream of light-signal pulses to include a first wavelength range of light and a second wavelength range of light; or emitting the stream of light-signal pulses to include a first wavelength range of light and a second wavelength range of light and receiving the stream of light-signal pulses including a first wavelength range of light and the second wavelength range of light synchronously at the image pixelated light imager.

14. A system of enhancing contrast of lighting, comprising:

a light-transmitting subsystem, including a light source to emit a stream of light-signal pulses having a first center wavelength emission of a first wavelength range of light:

a light-receiving subsystem, including:

a narrow bandpass filter having a center wavelength profile that corresponds with the first center wavelength emission of the stream of light-signal pulses, and a pixelated light imager to receive the stream of light-signal pulses after being optically filtered by the narrow bandpass filter to accept the first center wavelength emission and reject wavelengths of light outside of a bandwidth of the narrow bandpass filter; and an output display to display enhanced contrast display imagery received by the pixelated light imager.

15. The system of enhancing contrast of lighting of claim 14, wherein the light-transmitting subsystem further includes encoding circularly polarizing filter to optically encode the stream of light-signal pulses with circular polarization, and wherein the light-receiving subsystem includes a decoding circularly polarizing filter to optically decode the circular polarization of the stream of light-signal pulses prior to the stream of light-signal pulses being received by the pixelated light imager.

16. The system of enhancing contrast of lighting of claim 14, wherein, in operation, the stream of light-signal pulses emitted by the light source are synchronously correlated with a light-receiving frequency of the pixelated light imager.

17. The system of enhancing contrast of lighting of claim 16, further comprising a reference signal source that generates a reference signal to synchronize light source and the pixelated light imager.

18. The system of enhancing contrast of lighting of claim 17, wherein:

the reference signal source locally controls the stream of light-signal pulses emitted by the light source via wired or wireless communication and remotely controls the light-receiving frequency of the pixelated light imager via wireless communication;

a light source controller is included to control the stream of light-signal pulses emittable from the light source, wherein the reference signal source receives a pulse frequency corresponding to the stream of light-signal pulses by wired or wireless communication, and wherein the reference signal source wirelessly communicates the pulse frequency from an electromagnetic transmitter to the light-receiving subsystem;

the light-receiving subsystem further comprises the reference signal source, wherein the reference signal source locally controls the light-receiving frequency of the pixelated light imager or receives the light-receiving frequency from the pixelated light imager, and further wirelessly communicates the light-receiving frequency from an electromagnetic transmitter to remotely controls the stream of light-signal pulses emitted by the light source;

the reference signal source is located remotely with respect to both the light-transmitting subsystem and the light-receiving subsystem, and wherein reference signal source controls both the stream of light-signal pulses emitted by the light source and the light-receiving frequency of the pixelated light imager;

the reference signal source controls the stream of light-signal pulses emitted by the light source using a first reference signal oscillator located at the light-transmitting subsystem, and the reference signal source controls the light-receiving frequency of the pixelated light imager using a second reference signal oscillator located at the light-transmitting subsystem; or the reference signal is in the form of ultraviolet, visible light, infrared, microwave, radar, radio frequency, or a combination thereof.

19. The system of enhancing contrast of lighting of claim 14, wherein the pixelated light imager is part of a polarimetric light imaging assembly.

20. The system of enhancing contrast of lighting of claim 19, wherein the polarimetric light imaging assembly includes a multi-wavelength retarder with multiple light-receiving configurations.

21. The system of enhancing contrast of lighting of claim 14, wherein the light source comprises a first light to emit the first wavelength range of light and a second light to emit a second wavelength range of light.

22. The system of enhancing contrast of lighting of claim 21, wherein the second light operates as a reference signal source for synchronization of the first light with the pixelated light imager for enhancing contrast of the first light.

23. The system of enhancing contrast of lighting of claim 21, wherein:

the first light and the second light operate in combination with a reference signal source for synchronization of the first light and the second light with the pixelated light imager for enhancing contrast of the first light and the second light;

the first wavelength range of light is different than the second wavelength range of light by at least one-half of a first bandwidth of the first wavelength range of light or by at least one-half of a second bandwidth of the second wavelength range of light;

the pixelated light imager is optically associated with a first narrow bandpass filter having a center wavelength profile corresponding with a center wavelength emission of the first wavelength range of light; or the pixelated light imager is optically associated with a first narrow bandpass filter having a center wavelength profile corresponding with a center wavelength emission of the first wavelength range of light and the pixelated light imager is optically associated with a second narrow bandpass filter having a center wavelength profile corresponding with a center wavelength emission of the second wavelength range of light.

24. The system of enhancing contrast of lighting of claim 14, wherein the light source is a solid state LED light source or an SLED light source.

25. A method of enhancing contrast of lighting relative to background light using the system of claim 14, including:
   emitting the stream of light-signal pulses from the light source of the light-transmitting subsystem, wherein the stream of light-signal pulses includes the light-signal pulse having the center wavelength emission of the first wavelength range of light;
   optically filtering the stream of light-signal pulses at a light-receiving subsystem using a narrow bandpass filter having a center wavelength profile that corresponds with at least the center wavelength emission of the first wavelength range of light, and which excludes background light that is outside of a bandwidth range of light allowed by the narrow bandpass filter; and
   receiving the stream of light-signal pulses at the pixelated light imager of the light-receiving subsystem after optically filtering with the narrow bandpass filter.

26. The method of claim 25, further comprising optically encoding the stream of light-signal pulses with circular polarization at the light source, and optically decoding the circular polarization of the stream of light-signal pulses at a light-receiving subsystem.

27. The method of claim 26, wherein optically filtering with the narrow bandpass filter occurs before or after decoding the circular polarization.

28. The method of claim 25, further comprising synchronously correlating a light-receiving frequency of the pixelated light imager with a pulse frequency of the stream of light-signal pulses.

29. The method of claim 28, wherein synchronously correlating includes:
   synchronously receiving, using a polarimetric light imaging assembly at the light-receiving subsystem, the stream of modulated light-signal pulses;
   emitting the stream of light-signal pulses to include a first wavelength range of light and a second wavelength range of light; or
   receiving the stream of light-signal pulses including a first wavelength range of light and the second wavelength range of light synchronously at the pixelated light imager.

30. The system of enhancing contrast of lighting of claim 14, the light-receiving subsystem further comprising a processor to image process the stream of light-signal pulses and generate digital images to deliver to the output display.

31. The system of enhancing contrast of lighting of claim 30, wherein the light-receiving subsystem is located onboard a mobile carrier and the output display is also located on board the mobile carrier.

32. The system of enhancing contrast of lighting of claim 30, wherein the light-receiving subsystem is located onboard a mobile carrier and the output display is located remotely at a location not on board the mobile carrier.

33. A system of enhancing contrast of lighting, comprising:
   a light-transmitting subsystem, including a light source to emit a stream of light-signal pulses and an encoding circularly polarizing filter to optically encode the stream of light-signal pulses with circular polarization; and
   a light-receiving subsystem, including a decoding circularly polarizing filter to optically decode the circular polarization of the stream of light-signal pulses and a pixelated light imager to receive the stream of light-signal pulses after being optically decoded by the decoding circularly polarizing filter, wherein:
      the encoding circularly polarizing filter includes both a linear polarizer and a quarter wave plate;
      the light-receiving subsystem further comprising a processor to image process the stream of light-signal pulses and generate digital images to deliver to an output display;
      the light-receiving subsystem is located onboard a mobile carrier and the output display is also located on board the mobile carrier; or
      the light-receiving subsystem is located onboard a mobile carrier and the output display is located remotely at a location not on board the mobile carrier.

34. The system of enhancing contrast of lighting of claim 33, wherein the light-receiving subsystem includes the processor.

35. The system of enhancing contrast of lighting of claim 34, wherein the light-receiving subsystem is located onboard a mobile carrier, and wherein the output display is also located on board the mobile carrier or is located remotely at a location not on board the mobile carrier.

36. The system of enhancing contrast of lighting of claim 33, wherein the encoding circularly polarizing filter includes both the linear polarizer and the quarter wave plate.

37. A system of enhancing contrast of lighting, comprising:
   a light-transmitting subsystem, including a light source to emit a stream of light-signal pulses, wherein the stream of light-signal pulses are encoded with circular polarization, a first center wavelength emission, or both;
   a light-receiving subsystem, including:
      a decoding circularly polarizing filter to optically decode the circular polarization of the stream of light-signal pulses,
      a narrow bandpass filter having a center wavelength profile that corresponds with the first center wavelength emission of the stream of light-signal pulses, or both; and
   a light imager to receive the stream of light-signal pulses after being optically decoded by the decoding circularly polarizing filter, the narrow bandpass filter, or both, wherein the light imager is part of a polarimetric light imaging assembly including a multi-wavelength retarder with multiple light-receiving configurations.

38. The system of enhancing contrast of lighting of claim 37, further comprising encoding circularly polarizing filter, wherein the light-transmitting subsystem encodes the stream of light-signal pulses with the circular polarization using the encoding circularly polarizing filter.

39. The system of enhancing contrast of lighting of claim 37, wherein the light-transmitting subsystem encodes the stream of light-signal pulses with the first center wavelength emission.

40. The system of enhancing contrast of lighting of claim 37, wherein the light source is configured to emit the stream of light-signal pulses from a first light in the form of a first wavelength range of light and a second light in the form of a second wavelength range of light.

41. A system of enhancing contrast of lighting, comprising:
- a light-transmitting subsystem, including a light source to emit a stream of light-signal pulses and an encoding circularly polarizing filter to optically encode the stream of light-signal pulses with circular polarization;
- a light-receiving subsystem, including a decoding circularly polarizing filter to optically decode the circular polarization of the stream of light-signal pulses and a pixelated light imager to receive the stream of light-signal pulses after being optically decoded by the decoding circularly polarizing filter; and
- a reference signal source that generates a reference signal to synchronize the light source and the pixelated light imager,
- wherein, in operation, the stream of light-signal pulses emitted by the light source are synchronously correlated with a light-receiving frequency of the pixelated light imager,
- and wherein:
  - the reference signal source locally controls the stream light-signal pulses emitted by the light source via wired or wireless communication and remotely controls the light-receiving frequency of the pixelated light imager via wireless communication;
  - a light source controller is included to control the stream of light-signal pulses emittable from the light source, wherein the reference signal source receives a pulse frequency corresponding to the stream of light-signal pulses by wired or wireless communication, and wherein the reference signal source wirelessly communicates the pulse frequency from an electromagnetic transmitter to the light-receiving subsystem;
  - the light-receiving subsystem further comprises the reference signal source, wherein the reference signal source locally controls the light-receiving frequency of the pixelated light imager or receives the light-receiving frequency from the pixelated light imager, and further wirelessly communicates the light-receiving frequency from an electromagnetic transmitter to remotely control the stream of light-signal pulses emitted by the light source;
  - the reference signal source is located remotely with respect to both the light-transmitting subsystem and the light-receiving subsystem, and wherein the reference signal source controls both the stream of light-signal pulses emitted by the light source and the light-receiving frequency of the pixelated light imager; or
  - the reference signal source controls the stream of light-signal pulses emitted by the light source using a first reference signal oscillator located at the light-transmitting subsystem, and the reference signal source controls the light-receiving frequency of the pixelated light imager using a second reference signal oscillator located at the light-transmitting subsystem; and
- the reference signal is in the form of modulated electromagnetic radiation with a wavelength that ranges from that of the low radio frequency to that of the vacuum ultraviolet; or
- the reference signal is in the form of modulated ultraviolet, visible light, infrared, microwave, radar, radio frequency, or a combination thereof.

* * * * *